(12) United States Patent
Xu et al.

(10) Patent No.: US 12,236,502 B2
(45) Date of Patent: Feb. 25, 2025

(54) POST-PROCESSING SPECIAL EFFECT PRODUCTION SYSTEM AND METHOD, AND AR SPECIAL EFFECT RENDERING METHOD AND APPARATUS

(71) Applicant: Beijing Zitiao Network Technology Co., Ltd., Beijing (CN)

(72) Inventors: Jiancong Xu, Beijing (CN); Yang Lv, Beijing (CN); Ruifeng Ma, Beijing (CN); Haoming Tan, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 32 days.

(21) Appl. No.: 18/059,855

(22) Filed: Nov. 29, 2022

(65) Prior Publication Data
US 2023/0334723 A1    Oct. 19, 2023

(30) Foreign Application Priority Data
Apr. 15, 2022  (CN) .......................... 202210399052.5

(51) Int. Cl.
*G06T 11/00*       (2006.01)
*G06F 3/0482*      (2013.01)
(Continued)

(52) U.S. Cl.
CPC ............ *G06T 11/00* (2013.01); *G06F 3/0482* (2013.01); *G06F 3/04845* (2013.01);
(Continued)

(58) Field of Classification Search
None
See application file for complete search history.

(56) References Cited

U.S. PATENT DOCUMENTS 10,825,258 B1 * 11/2020  Smet ...................... G06T 11/206
11,030,814 B1 *  6/2021  Kwiatkowski ........ G06T 19/006
(Continued)

FOREIGN PATENT DOCUMENTS

| CN | 110674341 A | 1/2020 |
| CN | 110704043 A | 1/2020 |

(Continued)

OTHER PUBLICATIONS

Haringer, Matthias, and Steffi Beckhaus. "Effect based scene manipulation for multimodal VR systems." 2010 IEEE Virtual Reality Conference (VR). IEEE, 2010.*
(Continued)

*Primary Examiner* — Ryan M Gray
(74) *Attorney, Agent, or Firm* — Astute IP Law Group

(57) ABSTRACT

A post-processing special effect production system includes a visual operation panel and a resource file subsystem. The visual operation panel is configured to, in response to an operation instruction triggered by a user, perform a construction operation of a post-processing special effect component. The construction operation includes a node selection, an inter-node connection and a node parameter configuration that are performed for a related target node in the post-processing special effect component. The resource file subsystem is configured to provide the visual operation panel with a node-related file required by a construction of the post-processing special effect component, and receive and store a component resource file submitted by the visual operation panel relative to the post-processing special effect component.

17 Claims, 8 Drawing Sheets

(51) Int. Cl.
*G06F 3/04845* (2022.01)
*G06F 9/451* (2018.01)

(52) U.S. Cl.
CPC .... *G06F 9/451* (2018.02); *G06F 2203/04803* (2013.01); *G06T 2200/24* (2013.01); *G06T 2200/28* (2013.01)

(56) References Cited

U.S. PATENT DOCUMENTS

| | | | |
|---|---|---|---|
| 2008/0136817 A1 | 6/2008 | Dederichs et al. | |
| 2019/0333288 A1* | 10/2019 | Smet | G06T 19/006 |
| 2020/0320764 A1* | 10/2020 | Bryson | G06F 9/451 |
| 2021/0150731 A1* | 5/2021 | Saquib | G06F 3/017 |
| 2023/0162408 A1* | 5/2023 | Schager | G06T 11/00 |
| | | | 345/581 |

FOREIGN PATENT DOCUMENTS

| | | |
|---|---|---|
| CN | 113709573 A | 11/2021 |
| CN | 113938750 A | 1/2022 |
| CN | 114742981 A | 7/2022 |

OTHER PUBLICATIONS

International Search Report and Written Opinion in PCT/CN2023/080532, mailed Jun. 14, 2023, 20 pages.

* cited by examiner

POST-PROCESSING SPECIAL EFFECT PRODUCTION SYSTEM AND METHOD, AND AR SPECIAL EFFECT RENDERING METHOD AND APPARATUS

CROSS-REFERENCE TO RELATED APPLICATION(S)

This application claims priority to Chinese Patent Application No. 202210399052.5 filed Apr. 15, 2022, the disclosure of which is incorporated herein by reference in its entirety.

TECHNICAL FIELD

Embodiments of the present disclosure relate to the field of software development technology and, in particular, to a post-processing effect production system and method, and an AR effect rendering method and apparatus.

BACKGROUND

For a functional application of an augmented reality (AR) effect, the rendering of the AR effect needs to depend on one or more related post-processing renderings. In the development stage of the application, the development and production of the AR effect also include the development and production of various post-processing effects on which the AR effect depends.

For the existing development and production of post-processing effects on which AR effects depend, technicians always program each post-processing effect separately, configure a parameter for each post-processing effect separately, and set a connection relationship between different post-processing effects according to requirements.

The existing methods have the following problems: (1) As a key process in an AR effect production, programming and development have a high technical threshold and are prone to errors; even if some similar codes exist in the production of different AR effects, the codes need to be written repeatedly, resulting in the problem of repeated production; (2) a connection relationship between post-processing effects cannot be configured visually so that the configuration error rate is relatively high in the related art; (3) the rendering for each post processing in the production of an AR effect is performed separately, unable to implement the reuse of a rendering function.

SUMMARY

Embodiments of the present disclosure provide a post-processing effect production system and method, and an AR effect rendering method and apparatus so as to implement a simple and efficient production of a post-processing effect, avoiding the problem of repeated production in each phase in the related art.

In a first aspect, embodiments of the present disclosure provide a post-processing effect production system. The system includes a visual operation panel and a resource file subsystem.

The visual operation panel is configured to, in response to an operation instruction triggered by a user, perform a construction operation of a post-processing effect component. The construction operation includes a node selection, an inter-node connection and a node parameter configuration that are performed for a related target node in the post-processing effect component.

The resource file subsystem is configured to provide the visual operation panel with a node-related file required by a construction of the post-processing effect component, and receive and store a component resource file submitted by the visual operation panel relative to the post-processing effect component.

In a second aspect, embodiments of the present disclosure provide a post-processing effect production method. The method is performed by the post-processing effect production system according to embodiments in the first aspect of the present disclosure and includes the steps below.

A visual operation panel, in response to an operation instruction triggered by a user, performs a construction operation of a post-processing effect component. The construction operation includes a node selection, an inter-node connection and a node parameter configuration that are performed for a related target node in the post-processing effect component.

A resource file subsystem provides the visual operation panel with a node-related file required by a construction of the post-processing effect component, and receives and stores a component resource file submitted by the visual operation panel relative to the post-processing effect component.

In a third aspect, embodiments of the present disclosure provide an AR effect rendering method. The method includes the steps described below.

An instruction for starting a selected augmented reality (AR) effect is received.

An effect component on which AR effect rendering depends is determined.

A rendering component corresponding to the effect component is accessed, and the AR effect rendering is performed through rendering data in the rendering component.

The effect component includes a post-processing effect component. The post-processing effect component is produced through the post-processing effect production system described in the first aspect of the present disclosure.

In a fourth aspect, embodiments of the present disclosure provide an AR effect rendering apparatus. The apparatus includes an instruction receiving module, a component determination module, and an effect rendering module.

The instruction receiving module is configured to receive an instruction for starting a selected augmented reality (AR) effect.

The component determination module is configured to determine an effect component on which AR effect rendering depends.

The effect rendering module is configured to access a rendering component corresponding to the effect component and perform the AR effect rendering through rendering data in the rendering component.

The effect component includes a post-processing effect component. The post-processing effect component is produced through the post-processing effect production system described in the first aspect.

In a fifth aspect, embodiments of the present disclosure further provide an electronic device. The electronic device includes one or more processors, and a storage apparatus configured to store one or more programs.

The one or more programs, when executed by the one or more processors, cause the one or more processors to perform the post-processing effect production method described in the second aspect and/or perform the AR effect rendering method described in the third aspect.

In a sixth aspect, embodiments of the present disclosure further provide a computer-readable storage medium storing a computer program. When the computer program is executed by a processor, the post-processing effect production method described in the second aspect and/or the AR effect rendering method described in the third aspect is performed.

Embodiments of the present disclosure disclose a post-processing effect production system and method, and an AR effect rendering method and apparatus. The system includes a visual operation panel and a resource file subsystem. The visual operation panel is configured to, in response to an operation instruction triggered by a user, perform a construction operation of a post-processing effect component. The construction operation includes a node selection, an inter-node connection and a node parameter configuration that are performed for a related target node in the post-processing effect component. The resource file subsystem is configured to provide the visual operation panel with a node-related file required by a construction of the post-processing effect component, and receive and store a component resource file submitted by the visual operation panel relative to the post-processing effect component. The system encapsulates each pre-formed material function into a node and stores a node-related resource file in the resource file subsystem. When the post-processing effect component is constructed, the construction of the post-processing effect component can be implemented only by performing the node selection, the inter-node connection and the node parameter configuration in the visual operation panel, and calling the node-related file required by the construction of the post-processing effect component from the resource file subsystem. Accordingly, the construction is simple, efficient, and reusable, avoiding the repeated production of a related file when each post-processing effect is produced. Moreover, a relationship between nodes in the post-processing effect can be configured on the visual operation panel, implementing a concise connection relationship between post-processing effects. The preceding technical solutions of this embodiment effectively save the cost of producing a post-processing effect related to an augmented effect, and improve the operability of producing the post-processing effect.

BRIEF DESCRIPTION OF DRAWINGS

To illustrate the solutions in the exemplary embodiments of the present disclosure more clearly, the drawings used in the embodiments will be described below. The drawings described below are part, not all, of the drawings of embodiments of the present disclosure. Those of ordinary skill in the art may obtain other drawings based on the drawings described below on the premise that no creative work is done.

DETAILED DESCRIPTION

Figure 1:
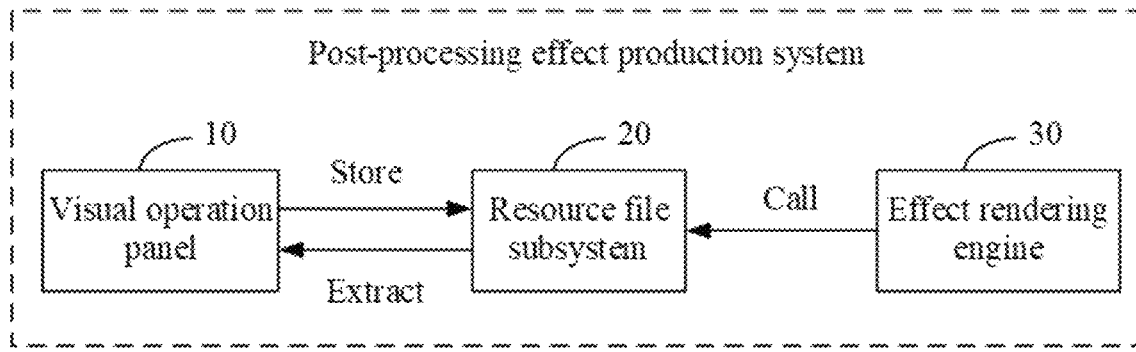
FIG. 1 is a diagram illustrating the structure of a post-processing effect production system according to embodiment one of the present disclosure.

Embodiments of the present disclosure are described in more detail hereinafter with reference to the drawings. Although some embodiments of the present disclosure are shown in the drawings, it is to be understood that the present disclosure may be implemented in various forms and should not be construed as limited to the embodiments set forth herein; conversely, these embodiments are provided so that the present disclosure will be thoroughly and completely understood. It is to be understood that drawings and embodiments of the present disclosure are merely illustrative and are not intended to limit the scope of the present disclosure.

It is to be understood that the various steps recorded in the method embodiments of the present disclosure may be performed in a different order, and/or in parallel. In addition, the method embodiments may include additional steps and/or omit performing the illustrated steps. The scope of the present disclosure is not limited in this respect.

As used herein, the term "include" and variations thereof are intended to be inclusive, that is, "including, but not limited to". The term "based on" is "at least partially based on". The term "one embodiment" means "at least one embodiment"; the term "another embodiment" means "at least one another embodiment"; and the term "some embodiments" means "at least some embodiments". Related definitions of other terms are given in the description hereinafter.

It is to be noted that references to "first", "second" and the like in the present disclosure are merely intended to distinguish one from another apparatus, module, or unit, and are not intended to limit the order or interrelationship of the functions performed by the apparatus, module, or unit. It is to be noted that references to modifications of "one" or "a plurality" mentioned in the present disclosure are intended to be illustrative and not limiting; those skilled in the art should understand that "one" or "a plurality" should be understood as "one or more" unless clearly expressed in the context.

The names of messages or information exchanged between multiple apparatuses in embodiments of the present disclosure are only for illustrative purposes and are not intended to limit the scope of such messages or information.

Embodiment One

FIG. 1 is a diagram illustrating the structure of a post-processing effect production system according to embodiment one of the present disclosure. This embodiment is applicable to the case of producing a post-processing effect in an AR effect. The system may be implemented by software and/or hardware and may be configured in a terminal and/or a server.

In a practical application, in order to complete the development of one AR effect, it is necessary to implement the development and production of a plurality of post-processing effects. The production of each post-processing effect needs to include the following processes: (1) Functional programming is performed for each post-processing effect separately to form a corresponding material function; (2) a corresponding material parameter (including a texture parameter and another parameter) configuration is performed for each post-processing effect separately; (3) a connection structure between various post-processing effects related to an AR effect is determined; (4) a rendering sequence of various post-processing effects is determined according to the determined connection structure, and post-processing effect rendering is performed according to the rendering sequence and in combination with a corresponding rendering function.

The existing methods for producing a post-processing effect have the following problems: (1) As a key process in an AR effect production, programming and development have a high technical threshold and are prone to errors; even if some similar codes exist in the production of different AR effects, the codes need to be written repeatedly, resulting in the problem of repeated production; (2) a connection relationship between post-processing effects cannot be configured visually so that the configuration error rate is relatively high in the related art; (3) the rendering for each post processing in the production of an AR effect is performed separately, unable to implement the reuse of a rendering function. On this basis, this embodiment provides the post-processing effect production system to solve the problems existing in the related art.

As shown in FIG. 1, the post-processing effect production system provided in embodiment one of the present disclosure may specifically include a visual operation panel 10 and a resource file subsystem 20. The visual operation panel 10 is configured to, in response to an operation instruction triggered by a user, perform a construction operation of a post-processing effect component. The construction operation includes a node selection, an inter-node connection and a node parameter configuration that are performed for a related target node in the post-processing effect component. The resource file subsystem 20 is configured to provide the visual operation panel with a node-related file required by a construction of the post-processing effect component, and receive and store a component resource file submitted by the visual operation panel relative to the post-processing effect component.

It is clear that an AR effect has become a relatively common function item in an application such as an entertainment application and a social network application. A user may use the AR effect function item to render original information (for example, an original image). The performed AR effect rendering may be adding a filter to the original image, or adding a scene effect, such as rain and petal rain, to the original image. In general, an AR effect in practical use requires a relevant technician to provide technical support through the production of the AR effect. The production of the AR effect is mainly based on the production of a post-processing effect. That is, the precondition for the technician to implement the production of the AR effect is to first implement the production of the post-processing effect associated with the AR effect.

This embodiment provides the post-processing effect production system. The technician producing the post-processing effect can be taken as an oriented user of the system. The user can complete the production of the post-processing effect related to the AR effect through the production system. In this embodiment, the provided production system specifically includes the visual operation panel 10 and the resource file subsystem 20. The visual operation panel 10 may serve as a human-computer interaction interface displayed to the user for performing the related construction operation of the post-processing effect component.

In this embodiment, the resource file subsystem 20 is equivalent to a file management system storing the related file information required by the construction of the post-processing effect component. The file information related to the construction operation may be determined according to the construction operation triggered by the user and provided for the visual operation panel 10 to support the response of the visual operation panel 10 to the construction operation. Additionally, the resource file subsystem 20 may also receive and save the component resource file related to the post-processing effect component created by the user so that the file information required for rendering the post-processing effect component is provided in a subsequent logical implementation.

For the production system provided in this embodiment, from the perspective of the user using the production system, when the to-be-produced effect exists and the requirements for producing the post-processing effect are met, the construction operation needing to be performed by the user includes the node selection, the inter-node connection and the node parameter configuration that are performed for the related target node in the post-processing effect component.

First, for the selection of a node, the user may analyze which post-processing effects the AR effect depends on. Moreover, the user determines nodes related to the construction of post-processing effect components. On this basis, a selection operation of each related node may be performed in the visual operation panel. When the visual operation panel 10 responds to the node selection operation of the target node triggered by the user, all selected nodes serve as target nodes and are displayed on a visual interface.

Exemplarily, the visual operation panel 10 may display a menu list for the user to make a selection. The menu list includes options including a node adding option. The content displayed in the menu list and the display form may be set according to actual requirements. No specific limitations are made here. When the user wants to construct the post-processing effect component, the user may construct a required node according to the post-processing effect component, click on the display menu list on the visual interface through a signal input device such as a mouse and a touch screen, and select the required node by clicking or dragging the input device. An addible node in the menu list is displayed in the form of a node name. The displayed node name may be associated with a node-related file stored in the resource file subsystem 20, thus providing data information support for the display of the selected node in the visual operation panel. In a specific operation, the user may select the node by controlling the mouse to click on the node name. Additionally, the menu list may be set to get hidden when the user moves the mouse to control a cursor to move to a blank position.

Besides, the user may analyze a connection relationship between various related nodes in the post-processing effect component, determine a connection sequence between various selected nodes, and then perform a connection operation for the target node according to the connection sequence. When the visual operation panel 10 responds to the inter-node connection operation triggered by the user, the connection relationship between nodes is displayed on the visual operation panel 10 in the form of a connection line. It is clear that all the target nodes selected by the user may form a topological relationship through connection lines. Therefore, according to this embodiment, the post-processing effect component with a topological connection structure can be formed based on the target nodes and the connection lines.

Exemplarily, the visual operation panel 10 may display node icons of all the target nodes for the user to make a selection. Each node icon includes a connection port. The user may control the cursor to click on ports of two nodes through the input device such as the mouse so as to make a connection. Alternatively, the user may make a connection by dragging the cursor from one node port to another node port. No specific limitations are made here.

Finally, if the user does not have the configuration requirements for a target node, the user may submit the above-constructed post-processing effect component directly. If the user still wants to configure a parameter for each target node, the user may select any to-be-configured node among the displayed target nodes. The visual operation panel 10 displays a node parameter configuration window of the to-be-configured node. The user may perform a related node parameter configuration (for example, a texture parameter configuration or a configuration of another parameter item) for the selected node in the node parameter configuration window and may submit the constructed post-processing effect component after completing the configuration for the to-be-configured node.

It is to be noted that for one post-processing effect component, a node, a node connection relationship, and a node parameter configuration that are required for constructing the post-processing effect component are known to the user. The visual operation panel 10 displays different content according to an operation of the user. Moreover, no specific limitations are made to the sequence of a node connection operation and a node configuration operation. The user may perform the node connection operation first and then perform the node configuration operation. Alternatively, the user may perform the node configuration operation first and then perform the node connection operation.

It is to be known that the visual operation panel 10 responds to an operation of a production completion, and saves the produced post-processing effect component to the resource file subsystem 20 for reference in subsequent rendering. Moreover, when the user produces the post-processing effect component in the provided production system, a user behavior of clicking or dragging the cursor through the mouse or another input device may be determined through the parsing based on a collaboration of the related hardware or software of the system. Moreover, the specific operation performed by the user on the visual operation panel 10 may be determined through the analysis of behavior-related data information so that the operation instruction triggered by the user is received through the visual operation panel 10.

For the production system provided in this embodiment, from the perspective of a logic implementation of the system, the production of the post-processing effect component may be described as the following: A node selection of a target node is received first through the visual operation panel, and the target node is displayed on a related production interface of the visual operation panel; then a connection operation between selected target nodes is received, where for two nodes with a connection, the connection may represent the processing sequence between the two nodes; moreover, the operation of the node parameter configuration may also be received, and thus the construction of the post-processing effect component is completed to respond to the node parameter configuration.

Each selectable node in the production system is equivalent to a related material function in the post-processing effect. This embodiment may pre-form a node resource file of each material function, for example, a material programming file and a material attribute file. The node resource file is stored in the resource file subsystem. The target node is displayed on the visual operation panel. The node resource file acquired from the resource file subsystem 20 is mainly taken as low-layer data support. Moreover, after the node connection and node parameter configuration are performed for the target node, the entire node topological structure may serve as the produced post-processing effect component. The node topological structure, and the association information corresponding to each node in the node topological structure may serve as an entire component resource file to be stored in the resource file subsystem.

The production system of this embodiment requires some pre-processing operations before providing the user with a production service of the post-processing effect component. For example, functional programming is performed for each common post-processing material in advance to form a corresponding material function and be encapsulated into a node. Moreover, node-related information is stored in the resource file subsystem 20 in the form of a resource file. Each node may also form a node menu list through a node name for the user to make a selection. In this embodiment, because the resource file subsystem 20 stores the information related to a selected node in the production of the post-processing effect, the user does not need to perform material writing but only needs to select an appropriate node, thereby greatly saving manpower.

It is to be known that the resource file subsystem 20 may store a resource file of a single node or may store a resource file of a combined node composed of two or more nodes. The resource file of the combined node includes not only a material function but also a connection relationship between nodes in the combined node. A corresponding material parameter configuration is performed for each post-processing effect so as to be displayed to the user in a visual manner. The user may edit a material parameter through the external input device such as the mouse and a keyboard. Additionally, a connection structure between the post-processing effects associated with the AR effect is embodied in a visual manner of node connection, which is simple and clear.

This embodiment of the present disclosure discloses a post-processing effect production system. The system encapsulates each pre-formed material function into a node and stores a node-related resource file in the resource file subsystem. When the post-processing effect component is constructed, the construction of the post-processing effect component can be implemented only by performing the node selection, the inter-node connection and the node parameter configuration in the visual operation panel, and calling the node-related resource file required by the construction of the post-processing effect component from the resource file subsystem. Accordingly, the construction is simple, efficient, and reusable, avoiding the repeated production of a related file when each post-processing effect is produced. Moreover, a relationship between nodes in the post-processing effect can be configured on the visual operation panel, implementing a concise connection relationship between post-processing effects. The preceding technical solutions of this embodiment effectively save the cost of producing a post-processing effect related to an augmented effect and improve the operability of producing the post-processing effect.

As a first optional embodiment of this embodiment, the first optional embodiment optimizes and limits the resource file subsystem 20, further limiting that the resource file subsystem 20 includes a node resource file of each atomic node that has been created, a node resource file of each combined node that has been created, a node connection topology file of each combined node that has been created, and the component resource file of the post-processing effect component that has been produced. Each atomic node is a single node. Each combined node is a node topological structure constituted by at least two atomic nodes. The component resource file includes a node resource file of each node related to the post-processing effect component, a node connection topology file of each node related to the post-processing effect component, and a node port attribute file of each node related to the post-processing effect component. The node resource file includes a node programming file and a node parameter configuration file.

In this optional embodiment, the resource file subsystem 20 is configured to store node-related resource information. When the user produces the post-processing effect on the visual operation panel 10, such as the node selection, the inter-node connection and the node parameter configuration, related resource information may be called from the resource file subsystem 20.

It is to be noted that the node resource file subsystem not only stores a resource file related to an atomic node but also stores a resource file related to a combined node. The atomic node may be understood to be equivalent to a selectable node constituted by a post-processing material. The combined node may be understood as a selectable node constituted based on at least two atomic nodes and an inter-node topological structure. The selectable node may be understood, as a node that is displayed, in the form of a node name, in the node menu list on the visual operation panel and can be selected by the user.

Specifically, the combined node combines a plurality of atomic nodes into a single node with complex functions. A node port of the combined node and a material parameter of the combined node are from the atomic nodes. Moreover, the combined node does not have the concept of material reference. The corresponding node parameter configuration panel needs no material reference. The introduction of the combined node may further simplify the node connection and reduce the complexity of post-processing production.

A created atomic node corresponds to a node programming file and a node parameter configuration file which serve as a node resource file to be stored in the resource file subsystem 20. A created combined node corresponds to a node programming file, a node parameter configuration file, and a node topological structure file representing a connection relationship between atomic nodes in the combined node; and the node programming file, the node parameter configuration file, and the node topological structure file are stored in the resource file subsystem 20. A produced post-processing effect component corresponds to a node programming file, a node parameter configuration file, a node topological structure file representing a connection relationship between atomic nodes in a combined node, and a node port attribute file corresponding to a parameter configuration for original information such as an input image.

A node programming file includes a corresponding material function formed by performing functional programming for a post-processing material. A node parameter configuration file includes a corresponding material parameter of a post-processing material, such as a texture parameter and another parameter. A node connection topology file is only available for a combined node and represents a connection relationship between atomic nodes in a combined node. A node port attribute file includes a configuration parameter for original information.

As a second optional embodiment of this embodiment, the second optional embodiment optimizes and limits the post-processing effect production system, further limiting that the production system 20 includes an effect rendering engine 30. With continued reference to FIG. 1, the effect rendering engine 30 is configured to, when a calling condition of the post-processing effect component is satisfied, reference an associated component resource file from the resource file subsystem to constitute a scene component of the post-processing effect component and render the post-processing effect through the scene component.

The calling condition is that a current determination object during an effect component determination, after an augmented reality (AR) effect is started, is the post-processing effect component. It is to be understood that after the augmented reality (AR) effect is started, all effect components required by the augmented reality (AR) effect need to be determined first and then loaded successively. In the determination of an effect component, when the current determination object is the post-processing effect component, the effect rendering engine 30 starts to work.

In this optional embodiment, the effect rendering engine 30 references the component resource file associated with the post-processing effect from the resource file subsystem 20 to constitute the scene component of the post-processing effect component. The scene component may modify a resource file reference and configure a resource parameter. Compared with a traditional rendering component, the scene component panel of a node tool is more concise. Because the rendering of the post-processing effect is completed in the scene component, all post-processing is the same for the post-processing effect production system. The user does not need to care about implementation details so that the repeated use of post-processing rendering is implemented.

Figure 1A:
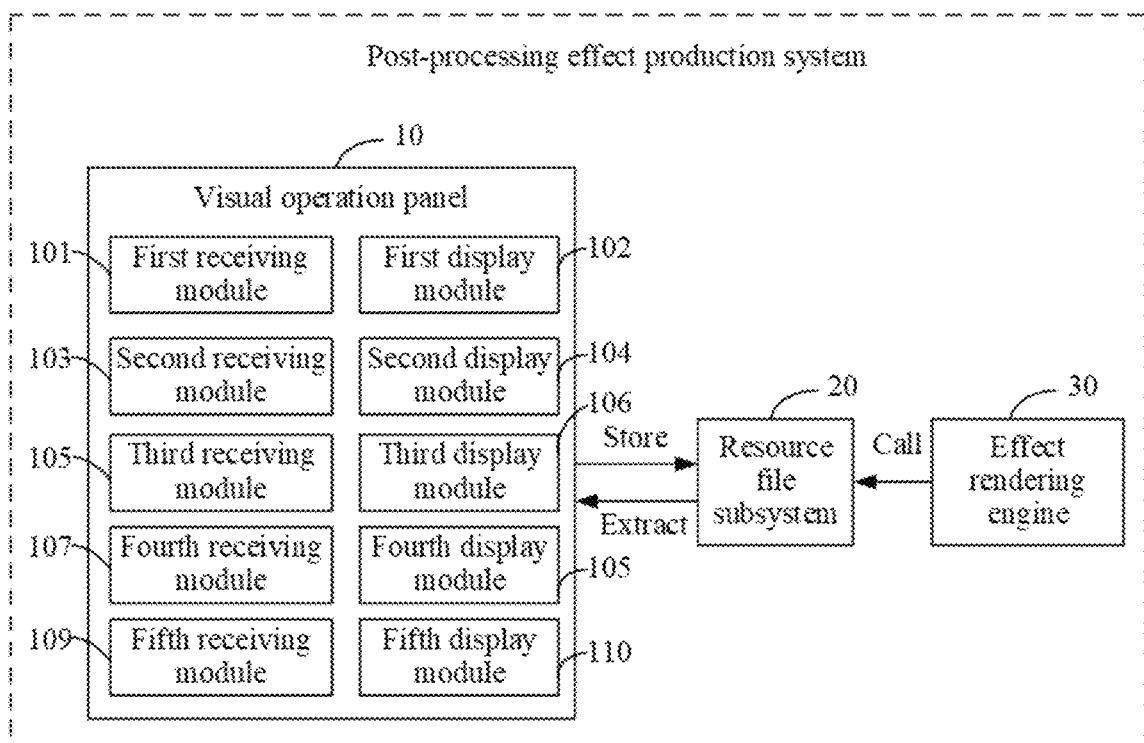
FIG. 1A is a diagram illustrating the structure of the post-processing effect production system according to embodiment one of the present disclosure.

As a third optional embodiment of this embodiment, the third optional embodiment optimizes and limits the visual operation panel. FIG. 1A is a diagram illustrating the structure of the post-processing effect production system according to embodiment one of the present disclosure. As shown in FIG. 1A, a further optimized visual operation panel 10 includes a first receiving module 101, a first display module 102, a second receiving module 103, and a second display module 104. The first receiving module 101 is configured to receive a node adding operation. The node adding operation is to select a node adding option from a menu list displayed on a component production interface. The first display module 102 is configured to display a node menu list. The node menu list includes at least one node name of at least one created post-processing node. The second receiving module 103 is configured to receive a node selection operation. The node selection operation is to select a target node name of the target node from the node menu list. The second display module 104 is configured to display the target node on the component production interface. The target node includes at least one node connection port. The component production interface is displayed in a first set region of a screen interface.

The first receiving module 101 is configured to receive the node adding operation. The node adding operation is to select the node adding option from the menu list displayed on the component production interface.

It is clear that when the user wants to produce the post-processing effect, all nodes required for producing the post-processing effect need to be selected first. The menu list on the component production interface may include options such as node adding, variable display/hiding, subgraph display/hiding, and combined node template adding. The option content and the display form of the menu list may be set according to actual requirements. No specific limitations are made here. In this optional embodiment, the user may control the cursor to click on and select an option displayed in the menu list through the signal input device such as the mouse and the touch screen. The user needs to perform the node adding operation by selecting the node adding option.

It is to be understood that a user behavior of selecting the node adding option by controlling the signal input device may be determined through the parsing based on a collaboration of the related hardware or software of the system. Moreover, the specific operation performed by the user on the visual operation panel 10 may be determined through the analysis of the data information related to the behavior of selecting the node adding option so that the first receiving module 101 receives the node adding operation triggered by the user.

In this optional embodiment, a specific implementation in which the system parses and determines that the user performs the node adding operation in the visual operation panel may be described as the following: A selected signal generated by controlling the cursor through the input device to click on the visual operation panel 10 may be responded to by configuring the visual operation panel 10 in the system, so that the clicking information generated when the input device controls a cursor click is acquired and fed back to a high-layer processing module; and the processing module may determine through the analysis of the clicking information whether the user performs the selection operation on the visual operation panel 10 and which option is selected through the operation. Through the selected option, the processing module may determine that the user controls the input device to select the node adding option on the visual operation panel.

In this case, the system may consider that the user makes an interaction of the node adding operation relative to the visual operation panel. The selection of the node adding option from the menu list may be in various forms and is set according to user requirements or operation habits. For example, the selection may be made through a left-click, a right-click, or a double-click.

The first display module 102 is configured to display the node menu list. The node menu list includes at least one node name of at least one created post-processing node.

In this optional embodiment, in response to the first receiving module 101 receiving the node adding operation, it may be considered that a final object of the preceding node adding operation is to display all nodes required for the production of the post-processing effect. The first display module 102 first displays a result after the node adding operation is responded to. Specifically, the first display module 102 displays the node menu list. The menu list and the node menu list are in a hierarchical relationship. The node menu list is a next-level display of the menu list. The display form of the node menu list may be set according to user requirements. The node menu list includes node names of all created post-processing nodes. It is to be understood that node names correspond to nodes in a one-to-one manner. A node resource file related to a node is stored in the resource file subsystem 20. The node name of the node is associated with the node resource file related to the node. The corresponding node resource file may be determined through the node name. It is to be understood that node resource files corresponding to all created nodes are included in the resource file subsystem 20 and that node names of these nodes are displayed in the node menu list.

It is to be known that from the perspective of the user, the user interactive operation corresponding to the node adding operation is specifically that by operating the input device, the user controls the cursor to be placed on and click on the node adding option in the menu list. In this case, after the first receiving module 101 receives and responds to the node adding operation, the first display module 102 may first display the node menu list on the visual operation panel 10. The user may select all required nodes in the node menu list.

The second receiving module 103 is configured to receive the node selection operation. The node selection operation is to select the target node name of the target node from the node menu list.

It is clear that when the user wants to construct the post-processing effect, all nodes required for producing the post-processing effect need to be selected first. Theoretically, all the nodes required for constructing the post-processing effect component are known to the user. The node menu list may include the node names corresponding to all the created nodes. Similar to the description of the first receiving module 101 in this optional embodiment, the second receiving module 102 is configured to receive the node selection operation. A specific representation of the node selection operation is that the user may control the cursor to click on and select a node name displayed in the node menu list through the signal input device such as the mouse and the touch screen.

The user needs to perform the node selection operation by selecting the node name. The node selection from the node menu list may be in various forms and is set according to user requirements or operation habits. For example, the selection may be made through a left-click, a right-click, or a double-click.

In this optional embodiment, a specific implementation in which the system parses and determines that the user performs the node selection operation may also be described as the following: by configuring the visual operation panel 10 in the system, a selected signal generated by controlling the cursor through the input device to click on the visual operation panel 10 can be responded to, so that the clicking information generated when the input device controls a cursor click is acquired, and fed back to a high-layer processing module; and the processing module may determine through the analysis of the clicking information whether the user performs the selection operation on the visual operation panel 10 and which node name is selected through the operation. Through the selected node name, a processing system may determine that the user controls the input device to select the required node on the visual operation panel 10.

In this case, the system may consider that the user makes an interaction of the node selection operation relative to the visual operation panel 10. The selection of the node name corresponding to the required node from the node menu list may be in various forms and is set according to user requirements or operation habits. It is to be understood that a user behavior of selecting the node name by controlling the input device may be determined through the parsing based on a collaboration of the related hardware or software of the system. Moreover, the specific operation performed by the user on the visual operation panel 10 may be determined through the analysis of the data information related to the behavior of selecting the node name so that the second receiving module 103 receives the node selection operation triggered by the user.

The second display module 104 is configured to display the target node on the component production interface. The target node includes at least one node connection port. The component production interface is displayed in the first set region of the screen interface.

In this optional embodiment, in response to the node selection operation received by the second receiving module 103, the second display module 104 displays a result after the node selection operation is responded to. Specifically, the second display module 104 displays the target node on the component production interface.

It is to be known that from the perspective of the user, the user interactive operation corresponding to the node selection operation is specifically that by operating the input device, the user controls the cursor to be placed on and click on the node name of a node, which the user wants to select, in the menu list. In this case, after the second receiving module 103 receives and responds to the node selection operation, the second display module 104 may display a node icon corresponding to the selected node name on the component production interface.

Of course, the user may also control the cursor to drag the icon of the target node through the mouse or another input device, implementing the movement of the icon of the target node and thereby adjusting the position of the icon of the target node on the component production interface. A movement track and movement position of the target node may be displayed on a second display interface in real-time according to the user.

It is to be understood that the resource file subsystem 20 stores the node resource file of each atomic node that has been created, the node resource file of each combined node that has been created, the node connection topology file of each combined node that has been created, and the component resource file of the post-processing effect component that has been produced. Accordingly, the selected node may be an atomic node or a combined node. When the selected node is an atomic node, a node icon corresponding to the single atomic node is displayed. When the selected node is a combined node, icons of a plurality of atomic nodes corresponding to the combined node are displayed; moreover, a connection relationship between the atomic nodes is displayed in the form of a connection line. The target node includes at least one node connection port used for a connection between different nodes. For an atomic node, the atomic node includes at least one node connection port. For a combined node, the combined node is taken as a whole and includes at least one node connection port.

A certain region on the screen interface may be designated for displaying the component production interface and may be taken as the first set region. For example, the left boundary of the screen may be designated as the left boundary of the first set region, the upper boundary of the screen interface may be designated as the upper boundary of the first set region, the lower boundary of the screen interface may be designated as the lower boundary of the first set region, and a line parallel to the right boundary of the screen interface and smaller than the right boundary of the screen interface is designated as the right boundary of the first set region. Alternatively, a region parallel to four boundaries of the screen interface but smaller than the screen interface is taken as the first set region. In a word, the component production interface is displayed in a set region of the screen interface.

It is clear that the post-processing effect production to be performed by the user may include two or more nodes. Correspondingly, the user may perform multiple node selection operations. It may also be understood that the user selects target nodes for multiple times. The first receiving module 101 receives a corresponding number of node adding operations. The first display module 102 displays the node menu list for corresponding times. The second receiving module 103 receives a corresponding number of node selection operations. The second display module 104 displays a corresponding number of target nodes on the component production interface. After the user selects all target nodes, all the selected target nodes are displayed in the first set region of the screen interface.

From the perspective of the user, the user may see that target node icons are displayed in the first set region of the screen interface. Each target node icon is marked with a node connection port. The target node icons are at different positions in the first set region. By controlling the mouse or another input device, the user may enable the cursor to drag a target node icon to be placed at an appropriate position.

Preferably, the target node is displayed on the component production interface as a single atomic node. Alternatively, the target node is displayed on the component production interface as a combined node constituted in the form of a node topological structure. The combined node includes at least two atomic nodes and a related node connection line.

It is to be understood that the combined node is composed of two or more atomic nodes. Moreover, a relationship between atomic nodes is represented in the form of a connection line. Specifically, when a selected node is an atomic node, the target node is displayed on the component production interface as a single atomic node. When a selected node is a combined node, the target node is displayed on the component production interface as a combined node constituted in the form of a node topological structure.

Exemplarily, when a selected target node is a single atomic node A, the node icon of the atomic node A is displayed on the component production interface. When a selected target node is a combined node B composed of atomic nodes B1, B2, and B3, node icons corresponding to the atomic nodes B1, B2, and B3 are displayed on the component production interface; moreover, a connection relationship between the atomic nodes B1, B2, and B3 is also displayed on the component production interface.

Further, the second display module 104 is specifically configured to perform the steps below.

In a1, the resource file subsystem is accessed, a node-related file corresponding to the target node is searched for through the target node name.

In this step, after the second receiving module 103 receives the node selection operation, the target node name of the user-selected target node may be acquired. The resource file subsystem stores the node resource file of each node that has been created. Each node corresponds to a unique node name. Each node name is associated with a corresponding node resource file. After the node selection operation is received and the target node name is determined, the resource file subsystem is accessed according to the target node name, and node-related files such as a node resource file corresponding to the target node name are searched for.

In b1, the target node is displayed in a set node form on the component production interface through the node-related file. The node-related file includes a node programming file and a node parameter configuration file. Alternatively, the node-related file includes a node programming file, a node parameter configuration file, and a node connection topology file.

In this optional embodiment, a node programming file may be specifically understood as including a corresponding material function formed by performing functional programming for a post-processing effect. A node parameter configuration file may be specifically understood as including a corresponding material parameter of a post-processing effect, such as a texture parameter and another parameter. Of course, for a combined node, a node programming file, a node parameter configuration file, and a node connection topology file representing a connection relationship between atomic nodes in the combined node are included.

The node form may be set according to user requirements. For example, the node may be displayed in the form of a block icon. The block icon is labeled with the node name. A port flag (for example, tex_in for an input port and tex_out for an output port) is displayed at an edge of the block icon.

With continued reference to FIG. 1A, further, the visual operation panel 10 further includes a third receiving module 105 and a third display module 106. The third receiving module 105 is configured to receive a node connection operation. The node connection operation is to drag the cursor from a first node connection port of a first node to a second node connection port of a second node. The first node and the second node are selected from target nodes displayed on the component production interface. The third display module 106 is configured to display a node connection line between the first node connection port and the second node connection port.

The third receiving module 105 is configured to receive the node connection operation. The node connection operation is to drag the cursor from the first node connection port of the first node to the second node connection port of the second node. The first node and the second node are selected from the target nodes displayed on the component production interface.

In this optional embodiment, the step performed by this module may be considered as a continuation based on steps performed by the preceding modules. The received node connection operation is also related to the movement of the cursor controlled by the user operating the mouse or another input device. Different from the above-received node addition operation and node selection operation, the node connection operation changes the manner of operating the mouse or another input device.

In this optional embodiment, in order to describe the node connection operation between two nodes more clearly, the two nodes to be connected are taken as the first node and the second node. Any two nodes directly associated with each other may be selected from the target nodes displayed on the component production interface so as to be connected. It is to be understood that the two nodes in this case to be connected are taken as the first node and the second node. When being connected to another node, the first node in this case may be taken as a first node or a second node in another node connection operation, and the second node in this case may be taken as a first node or a second node in another node connection operation.

Exemplarily, it is assumed that nodes are node A, node B, and node C. A connection relationship between the three nodes is that the output port of node A is connected to the input port of node B, and the output port of node B is connected to the input port of node C. When node A and node B are connected, node A and node B are taken as a first node and a second node respectively. When node B and node C are connected, node B and node C are taken as a first node and a second node respectively.

Alternatively, it is assumed that nodes are node A, node B, and node C. A connection relationship between the three nodes is that the output port of node A is connected to the input port of node B and is also connected to the input port of node C. When node A and node B are connected, node A and node B are taken as a first node and a second node respectively. When node A and node C are connected, node A and node C are taken as a first node and a second node respectively.

Specifically, instead of controlling the mouse or another input device to control the cursor to click on and select the content in the list, the user drags the cursor to move from the first node connection port of the first node to the second node connection port of the second node. The third receiving module 105 may identify the generated node connection operation and receive the node connection operation.

For the node connection operation, through the equipped screen interface, the system may first respond to a movement signal when the cursor is dragged and feed corresponding coordinate point information back to the high-layer processing module. Then the system analyzes a starting position, arrival position and movement track of the cursor corresponding to the coordinate point information. Finally, when the starting position, arrival position and movement track of the cursor all represent that the cursor is dragged from a node connection port of one node to a node connection port of another node, the operation performed by the user is determined as the node connection operation which may be received by the third receiving module 105 later.

The third display module 106 is configured to display the node connection line between the first node connection port and the second node connection port.

In this optional embodiment, in response to the node connection operation received by the preceding third receiving module 105, it may be analyzed that the node connection operation meets the condition of displaying the node connection line. Accordingly, the node connection line may be displayed with the acquired information of a coordinate point where the cursor is placed.

With continued reference to FIG. 1A, further, the visual operation panel 10 further includes a fourth receiving module 107 and a fourth display module 108. The fourth receiving module 107 is configured to receive a node configuration operation. The node configuration operation is to select any to-be-configured node from the displayed target nodes. The fourth display module 108 is configured to display, in a node parameter configuration panel, each parameter configuration item corresponding to the to-be-configured node so that the user implements a parameter configuration of the to-be-configured node by editing each parameter configuration item. The node parameter configuration panel is displayed in a second set region of the screen interface.

The fourth receiving module 107 is configured to receive the node configuration operation. The node configuration operation is to select any to-be-configured node from the displayed target nodes.

In this optional embodiment, the fourth receiving module 107 may be considered as a continuation based on steps performed by the preceding modules. After the node selection operation of the post-processing effect component and the inter-node connection construction of the post-processing effect component are received and a related display is performed, the fourth receiving module 107 receives the node configuration operation. From the perspective of the user, after completing the node selection operation of the target node and the inter-node connection operation of the target node, the user needs to further perform the node parameter configuration for each target node.

The user may select any node not configured from the displayed target nodes to serve as the to-be-configured node. The manner of the user selecting the to-be-configured node may be set according to user requirements or operation habits. For example, the selection may be made by left-clicking the icon of the to-be-configured node through the mouse, right-clicking the icon of the to-be-configured node through the mouse, or double-clicking the icon of the to-be-configured node through the mouse. It is clear that the component production interface is displayed in the first set region of the screen interface. In this case, the operation of the user selecting any to-be-configured node from the displayed target nodes is completed in the first set region.

In this optional embodiment, a specific implementation in which the system parses and determines that the user performs the node selection operation may also be described as the following: by configuring the visual operation panel 10 in the system, a selected signal generated by controlling the cursor through the input device to click on the visual operation panel 10 can be responded to, so that the clicking information generated when the input device controls a cursor click is acquired and fed back to a high-layer processing module; and the processing module may determine through the analysis of the clicking information whether the user performs the selection operation on the visual operation panel 10 and which to-be-configured node is selected through the operation. Through the selected to-be-configured node, the processing module may determine that the user controls the input device to select the to-be-configured node on the visual operation panel 10.

In this case, the system may consider that the user makes an interaction of the operation of selecting the to-be-configured node relative to the visual operation panel 10. Accordingly, the fourth receiving module 107 may interact with the user for the generated operation of selecting the to-be-configured node. It is to be understood that a user behavior of selecting the to-be-configured node by controlling the input device may be determined through the parsing based on a collaboration of the related hardware or software of the system. Moreover, the specific operation performed by the user on the visual operation panel 10 may be determined through the analysis of the data information related to the behavior of selecting the to-be-configured node so that the fourth receiving module 107 receives the node configuration operation triggered by the user.

The fourth display module 108 is configured to display, in the node parameter configuration panel, each parameter configuration item corresponding to the to-be-configured node so that the user implements the parameter configuration of the to-be-configured node by editing each parameter configuration item. The node parameter configuration panel is displayed in the second set region of the screen interface.

In this optional embodiment, in response to the node configuration operation received by the fourth receiving module 107, the fourth display module 108 displays a result after the node configuration operation is responded to. Specifically, each parameter configuration item corresponding to the to-be-configured node is displayed in the node parameter configuration panel.

It is to be known that from the perspective of the user, the user interactive operation corresponding to the node configuration operation is specifically as follows: When the user selects the to-be-configured node on the component production interface by operating the input device and after the fourth receiving module 107 receives and responds to the operation of selecting the to-be-configured node, the fourth display module 108 may display a node parameter configuration item corresponding to the selected node on the visual operation panel 10.

A certain region in the screen interface may be designated for displaying the node parameter configuration panel and may be taken as the second set region. For example, the right boundary of the screen may be designated as the right boundary of the second set region, the upper boundary of the screen interface may be designated as the upper boundary of the second set region, the lower boundary of the screen interface may be designated as the lower boundary of the second set region, and a line parallel to the left boundary of the screen interface and smaller than the left boundary of the screen interface is designated as the left boundary of the second set region. Alternatively, a region parallel to four boundaries of the screen interface but smaller than the screen interface is taken as the second set region. In a word, the component production interface is displayed in a set region of the screen interface.

It is to be understood that the second set region should be distinguished from the first set region. The second set region and the first set region should occupy different regions in the screen interface. For example, it may be set that the left half of the screen interface and the right half of the screen interface are the first set region and the second set region respectively. Alternatively, it may be set that the entire screen interface is the first set region and that a small region on the right of the screen interface is the second set region.

Specifically, the fourth display module 108 displays, in the node parameter configuration panel, each parameter configuration item corresponding to the to-be-configured node. The user implements the parameter configuration of the to-be-configured node by editing each parameter configuration item. A parameter configuration item includes a configuration of another parameter such as a material. To perform editing, the user may fill in relevant content through an input device such as the keyboard or select relevant content through an input device such as the mouse.

With continued reference to FIG. 1A, further, the visual operation panel 10 further includes a fifth receiving module 109 and a submission response module 110. The fifth receiving module 109 is configured to receive a production submission operation triggered by the user. The submission response module 110 is configured to take a node topological structure constructed and formed on the component production interface as the produced post-processing effect component and submit the corresponding component resource file to the resource file subsystem.

In this optional embodiment, the fifth receiving module 109 may be considered as a continuation based on steps performed by the preceding modules. After a target node selection, a connection between target nodes, and a parameter configuration for each target node that correspond to this post-processing effect are completed, it indicates that the user completes, through the visual operation panel 10, the construction of the node topological structure corresponding to this post-processing effect. In this case, the component resource file corresponding to the constructed node topological structure needs to be stored in the resource file subsystem 20.

From the perspective of the user, after completing the construction of the node topological structure, the user may click on a submission button to trigger the production submission operation. The submission button may be displayed with an icon labeled with the word "Submit" for the user to click on.

Specifically, when the cursor is at the submission button for performing a click, the system identifies the generated production submission operation, and receives the production submission operation through the fifth receiving module 109.

For the identification of the production submission operation, the system first responds to the clicking signal in a cursor click through the equipped screen interface and feeds corresponding clicking information back to the high-layer processing module. Then the system analyzes the clicked button corresponding to the clicking information. Finally, when the submission button is associated according to the clicking information, the operation performed by the user is determined as the production submission operation which may be received by the fifth receiving module later.

In this optional embodiment, in response to the production submission operation received by the fifth receiving module 109, the submission response module 110 may analyze that the production submission operation meets the condition of submission. Accordingly, the node topological structure constructed and formed on the component production interface is taken as the produced post-processing effect component. Moreover, a related resource file, for example, a node resource file of each node related to the post-processing effect component, a node connection topology file of each node related to the post-processing effect component, and a node port attribute file of each node related to the post-processing effect component, is submitted to and stored in the resource file subsystem 20.

Further, the submission response module 110 is specifically configured to perform the steps below.

In a2, the node topological structure constructed and formed on the component production interface is acquired and taken as the post-processing effect component currently produced.

Specifically, the node topological structure constructed and formed on the component production interface may be taken as the post-processing effect component currently produced.

In b2, node production information corresponding to each target node in the node topological structure is summarized and taken as the component resource file of the post-processing effect component, and the component resource file is submitted to the resource file subsystem.

The node production information includes the node resource information of each related node, the node connection topological relationship of each related node, and the node port attribute information of each related node. The node resource information includes node programming information and node parameter configuration information. Specifically, the node production information corresponding to each target node in the node topological structure is summarized and taken as the component resource file of the post-processing effect component, and the component resource file is submitted to and stored in the resource file subsystem for subsequent calling.

As a fourth optional embodiment of this embodiment, the fourth optional embodiment optimizes and limits the visual operation panel, further limiting that the resource file subsystem 20 is configured to name and store the component resource file according to a set naming format. The resource file subsystem is further configured to take a file name of the component resource file as a node name of a newly-constructed combined node to update the node menu list.

In this optional embodiment, steps performed by the resource file subsystem 20 may be considered as a continuation based on steps performed by the preceding modules. The component resource file corresponding to the post-processing effect component is stored in the resource file subsystem 20. When the resource file subsystem 20 receives the component resource file, the resource file subsystem 20 needs to name the component resource file so that the corresponding post-processing effect component is identified. The set naming format may be a Chinese node name, an English node name, or another naming manner through which the component resource file is identified.

It is to be understood that the post-processing effect component stored in the resource file subsystem 20 may be taken as a new combined node to be used by the user. Accordingly, in order to enable nodes to correspond to corresponding component resource files in a one-to-one manner, the file name of a component resource file may be taken as the node name of a newly-constructed combined node and updated to the node menu list. Subsequently, when the user selects a node, the user may view the node name of the newly-constructed combined node in the node menu list. Similarly, the node may also be selected to serve as a node used in another post-processing effect production according to requirements.

This optional embodiment embodies the structure of the visual operation panel and optimizes that the production system further includes the effect rendering engine. In this embodiment, because the resource file subsystem 20 stores the information related to a selected node in the production of the post-processing effect, the user does not need to perform material writing but only needs to select an appropriate node, thereby greatly saving manpower. In this system, a post-processing material referenced by a node is prefabricated. Accordingly, the user does not need to perform material writing but only needs to select an appropriate node, thereby greatly saving manpower. Additionally, an input-output relationship between nodes is implemented through a node connection, which is simple, intuitive, and not easy to be wrong. The form of the scene component implements post-processing rendering. The scene component may modify a resource file reference and configure a resource parameter. Compared with a traditional rendering component, the scene component panel of a node tool is more concise.

In order to better display the working principle of the post-processing effect production system according to this embodiment, this embodiment describes a specific implementation of the post-processing effect production based on a user interactive operation from the perspective of visualization through an example below.

Figure 1B:
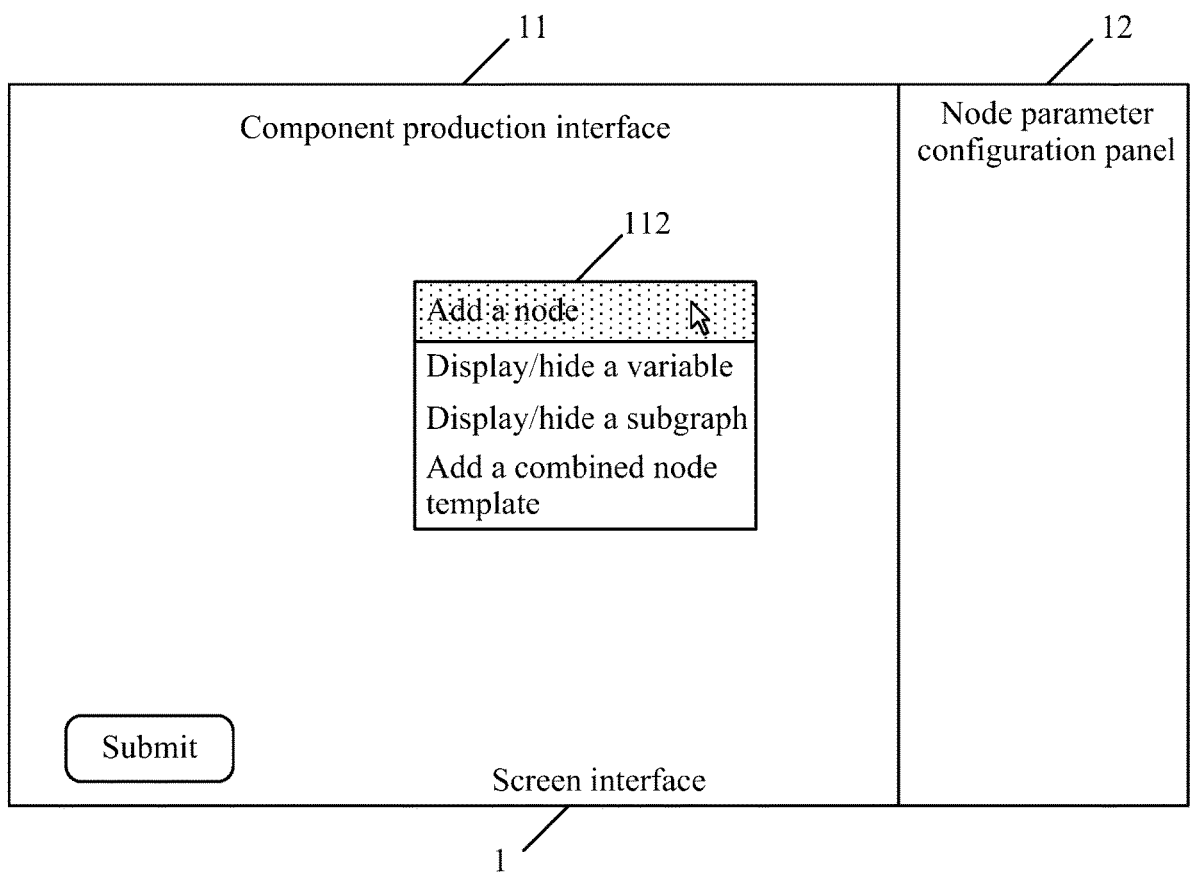
FIG. 1B is a diagram illustrating an interface of performing a node adding operation according to embodiment one of the present disclosure.

Specifically, from the perspective of visualization, first, the screen interface 1 provided by the post-processing effect production system is divided into two parts, the first set region and the second set region. The first set region is configured to display the component production interface 11. The second set region is configured to display the node parameter configuration panel 12. First, on the component production interface 11, the user right-clicks the mouse to make the component production interface 11 display the menu list 112 (this embodiment does not specifically limit the input device or an operation action which may be a touch control operation performed through a finger). A plurality of operations including the node adding operation is displayed in the menu list 112. A response result may be embodied by the content displayed on the component production interface. In this example, FIG. 1B is a diagram illustrating an interface of performing a node adding operation according to embodiment one of the present disclosure. As shown in FIG. 1B, the interface is an interface for the user to perform the node adding operation. In FIG. 1B, the node adding operation is as follows: The node adding option is selected from the menu list by controlling the cursor through the mouse, and it is seen that the color of the selected node adding option turns gray.

Figure 1C:
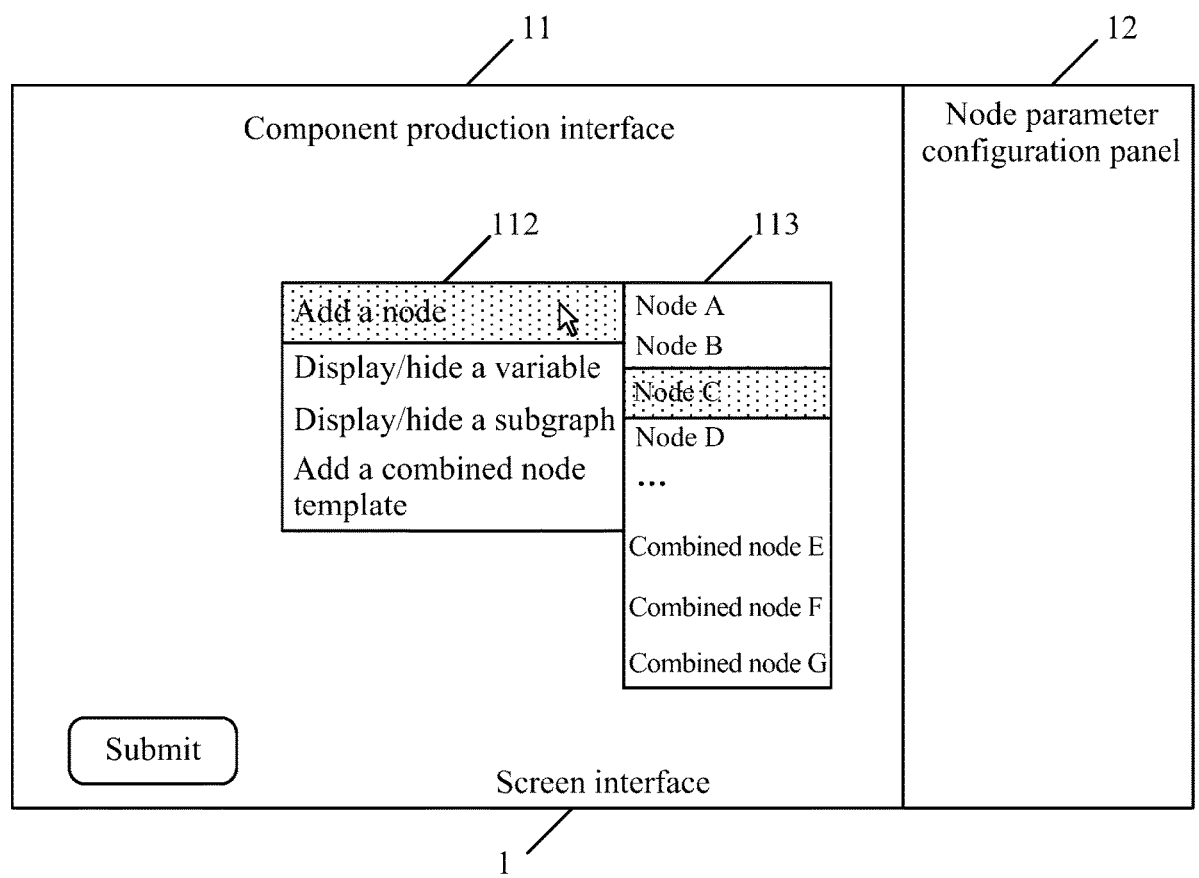
FIG. 1C is a diagram illustrating an interface displayed by a first display module according to embodiment one of the present disclosure.

Following the preceding example, a response result of receiving the node adding operation is displayed in a form shown in FIG. 1C. FIG. 1C is a diagram illustrating an interface displayed by the first display module according to embodiment one of the present disclosure. As shown in FIG. 1C, the display interface is an interface displayed relative to the component production interface after the first receiving module receives the node adding operation of the user. It is seen that the node menu list 113 is displayed on the component production interface and includes node names of a plurality of created post-processing nodes.

From the perspective of the user, the user may perform the node selection operation on the interface shown in FIG. 1C. In FIG. 1C, the node selection operation is as follows: A node name corresponding to a target node is selected from the node menu list 113 by controlling the cursor through the mouse, and it is seen that the color of the selected node name of the node target turns gray.

Figure 1D:
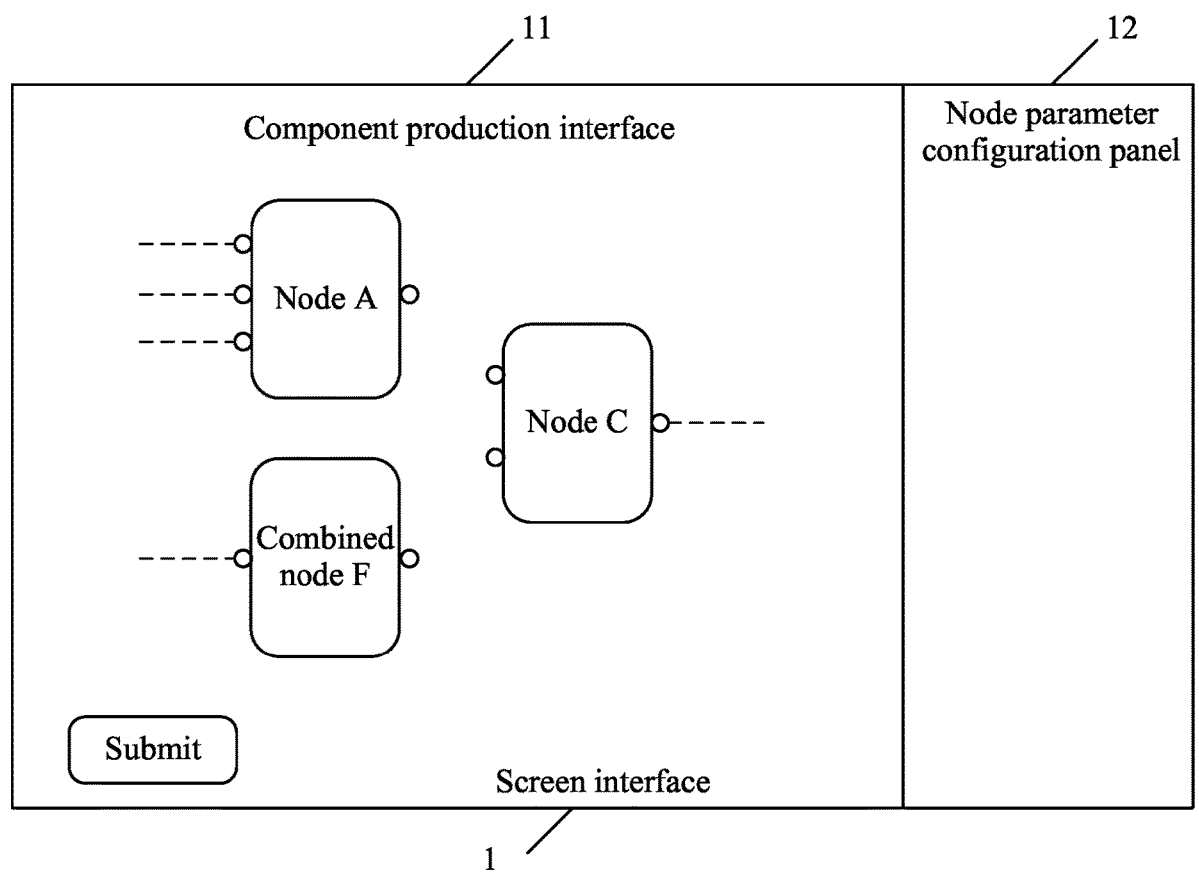
FIG. 1D is a diagram illustrating an interface displayed by a second display module according to embodiment one of the present disclosure.

Following the preceding example, a response result of receiving the node selection operation is displayed in a form shown in FIG. 1D. FIG. 1D is a diagram illustrating an interface displayed by the second display module according to embodiment one of the present disclosure. As shown in FIG. 1D, the display interface is an interface displayed relative to the component production interface 11 after the second receiving module receives the node selection operation of the user. A node icon corresponding to a target node is displayed on the component production interface 11. When the user selects a plurality of target nodes, node icons of the target nodes are displayed on the component production interface 11. It is seen that the user selects node A, node C, and combined node F as target nodes. Correspondingly, a node icon of node A, a node icon of node C, and a node icon of combined node F are displayed on the component production interface 11. Each node has a node connection port.

From the perspective of the user, the user may perform the node connection operation for a target node on the interface shown in FIG. 1D. The node connection operation is as follows: The cursor is dragged from one node connection port of one node to one node connection port of another node by controlling the mouse. For example, the cursor is dragged from the output port of node A to the input port of node C.

Figure 1E:
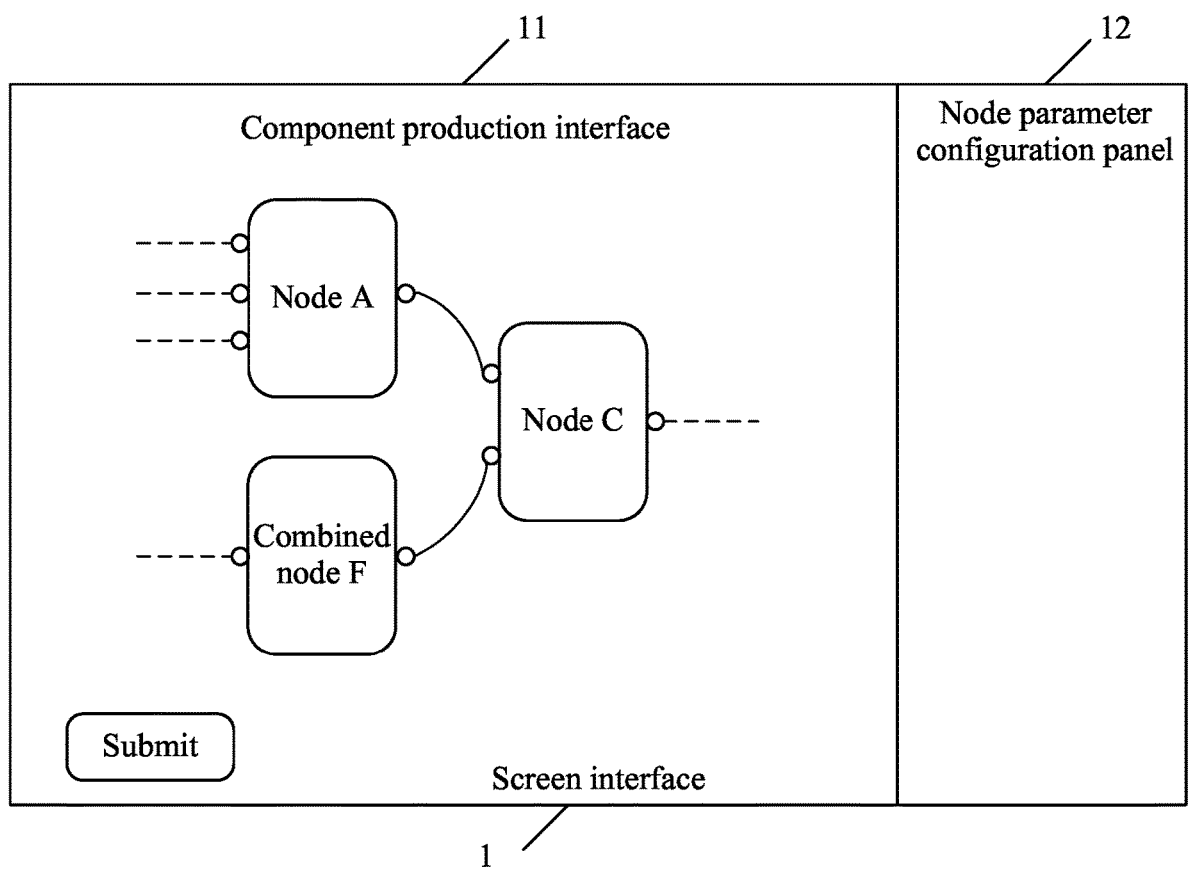
FIG. 1E is a diagram illustrating an interface displayed by a third display module according to embodiment one of the present disclosure.

Following the preceding example, a response result of receiving the node connection operation is displayed in a form shown in FIG. 1E. FIG. 1E is a diagram illustrating an interface displayed by the third display module according to embodiment one of the present disclosure. As shown in FIG. 1E, the display interface is an interface displayed relative to the component production interface 11 after the third receiving module receives the node connection operation of the user. Node icons corresponding to a plurality of target nodes are displayed on the component production interface 11. When the user completes node connection operations for all the target nodes, a connection relationship between all the target nodes is displayed on the component production interface 11 and may be understood as one node topological structure. It is seen that the node connection relationship is as follows: The output port of node A is connected to the input port of node C, and the output port of combined node F is connected to the input port of node C.

From the perspective of the user, the user may perform the node parameter configuration operation for a target node on the interface shown in FIG. 1E. The node parameter configuration operation is as follows: Any to-be-configured node is selected from the displayed target nodes by controlling the cursor through a mouse click. It is seen that if node C is selected for a node parameter configuration, the color of the node icon of node C turns gray.

Figure 1F:
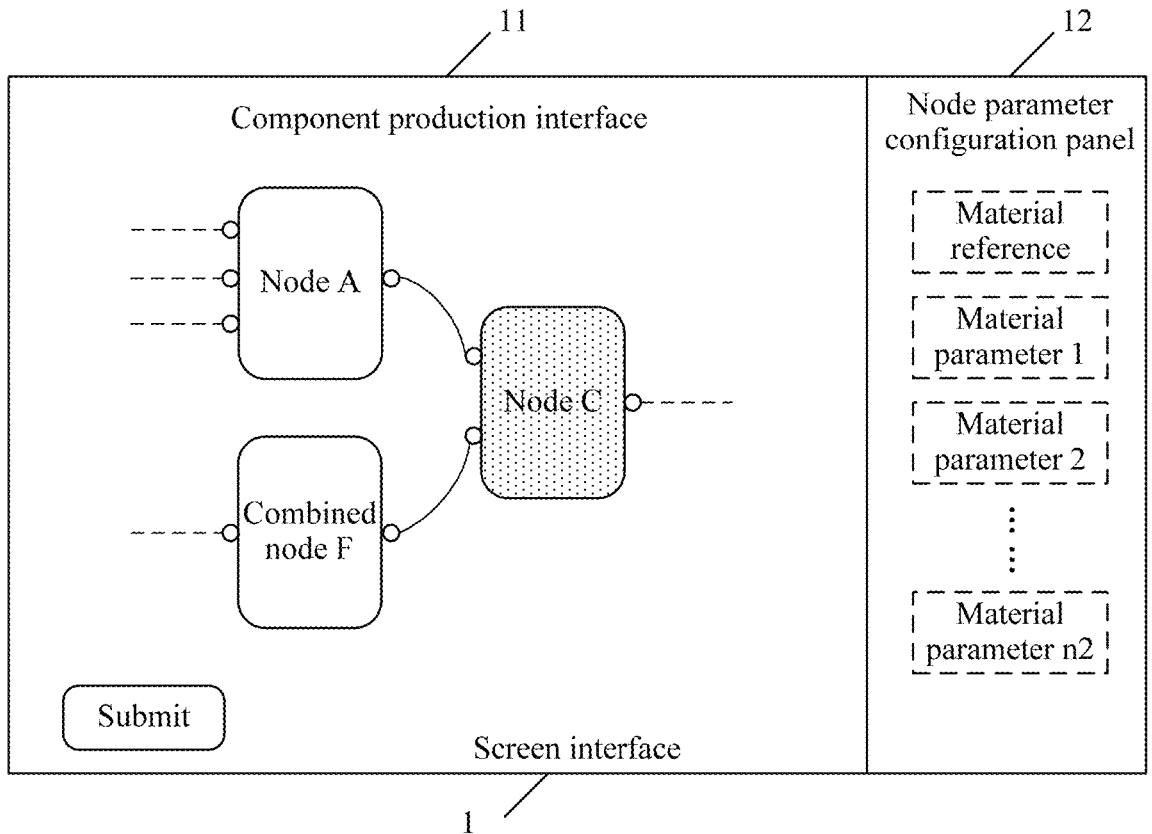
FIG. 1F is a diagram illustrating an interface displayed by a fourth display module according to embodiment one of the present disclosure.

Following the preceding example, a response result of receiving the node configuration operation is displayed in a form shown in FIG. 1F. FIG. 1F is a diagram illustrating an interface displayed by a fourth display module according to embodiment one of the present disclosure. As shown in FIG. 1F, the display interface is an interface displayed relative to the node parameter configuration panel 12 after the fourth receiving module receives the node configuration operation of the user. Each parameter configuration item corresponding to a to-be-configured node is displayed in the node parameter configuration panel 12. For example, after node C is selected, a parameter configuration item of node C is displayed in the node parameter configuration panel 12.

From the perspective of the user, the user may implement the parameter configuration of the to-be-configured node by editing a parameter configuration item of a target node in the node parameter configuration panel shown in FIG. 1F. After the node parameter configuration for all the target nodes is completed, the construction of the post-processing effect component produced on the visual operation panel is completed. The user may trigger the production submission operation, which may be embodied as controlling the cursor through the mouse to click on the "Submit" button 111.

Following the preceding example, a response result of receiving the production submission operation triggered by the user is as follows: The node topological structure constructed and formed on the component production interface is taken as the produced post-processing effect component, and the corresponding component resource file is submitted to the resource file subsystem. Hereto in the post-processing effect production, the interaction between the user and the visual operation panel in the post-processing effect production system is completed.

The user does not need to participate in subsequent operations. When a calling condition of the post-processing effect component is satisfied, the effect rendering engine references an associated component resource file from the resource file subsystem to constitute a scene component of the post-processing effect component and renders the post-processing effect through the scene component.

Embodiment Two

Figure 2:
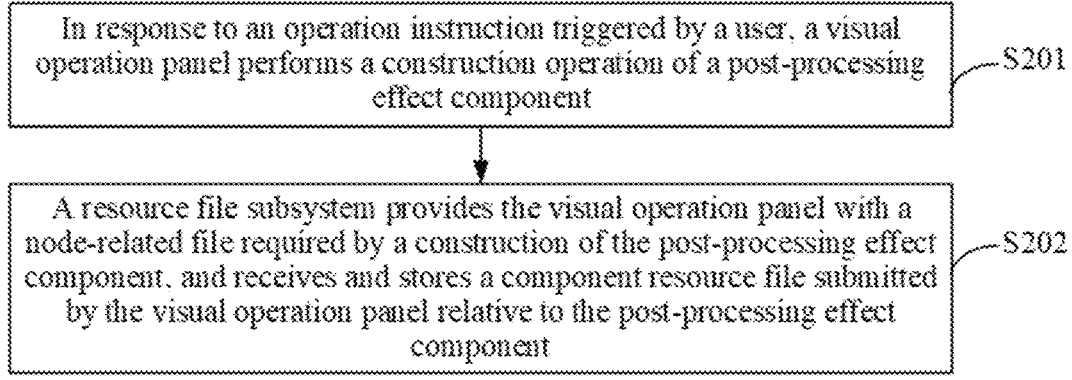
FIG. 2 is a flowchart of a post-processing effect production method according to embodiment two of the present disclosure.

FIG. 2 is a flowchart of a post-processing effect production method according to embodiment two of the present disclosure. This embodiment is applicable to the case of producing a post-processing effect in an AR effect. The method may be performed by a post-processing effect production system. The system may be implemented by software and/or hardware and may be configured in an electronic device such as a terminal and/or a server so as to implement the post-processing effect production method in this embodiment of the present disclosure.

As shown in FIG. 2, the post-processing effect production method provided in embodiment two specifically includes the steps below.

In S201, a visual operation panel, in response to an operation instruction triggered by a user, performs a construction operation of a post-processing effect component. The construction operation includes a node selection, an inter-node connection and a node parameter configuration that are performed for a related target node in the post-processing effect component.

This embodiment provides the post-processing effect production method. The technician producing the post-processing effect can be taken as an oriented user of the method. The user can complete the production of the post-processing effect related to the AR effect through the production method. In this embodiment, the visual operation panel may serve as a human-computer interaction interface displayed to the user for performing the related construction operation of the post-processing effect component.

For the production method provided in this embodiment, from the perspective of the user using the production method, when the to-be-produced effect exists and the requirements for producing the post-processing effect are met, the construction operation needing to be performed by the user includes the node selection, the inter-node connection and the node parameter configuration that are performed for the related target node in the post-processing effect component.

First, for the selection of a node, the user may analyze which post-processing effects the AR effect depends on. Moreover, the user determines nodes related to the construction of post-processing effect components. On this basis, a selection operation of each related node may be performed in the visual operation panel. When the visual operation panel responds to the node selection operation of the target node triggered by the user, all selected nodes serve as target nodes and are displayed on a visual interface.

Exemplarily, the visual operation panel may display a menu list for the user to make a selection. The menu list includes options including a node adding option. The content displayed in the menu list and the display form may be set according to actual requirements. No specific limitations are made here. When the user wants to construct the post-processing effect component, the user may construct a required node according to the post-processing effect component, click on the display menu list on the visual interface through a signal input device such as a mouse and a touch screen, and select the required node by clicking or dragging the input device. An addible node in the menu list is displayed in the form of a node name. The displayed node name may be associated with a node-related file stored in the resource file subsystem, thus providing data information support for the display of the selected node in the visual operation panel. In a specific operation, the user may select the node by controlling the mouse to click on the node name. Additionally, the menu list may be set to get hidden when the user moves the mouse to control a cursor to move to a blank position.

Besides, the user may analyze a connection relationship between various related nodes in the post-processing effect component, determine a connection sequence between various selected nodes, and then perform a connection operation for the target node according to the connection sequence. When the visual operation panel responds to the inter-node connection operation triggered by the user, the connection relationship between nodes is displayed on the visual operation panel in the form of a connection line. It is clear that all the target nodes selected by the user may form a topological relationship through connection lines. Therefore, according to this embodiment, the post-processing effect component with a topological connection structure can be formed based on the target nodes and the connection lines.

Exemplarily, the visual operation panel may display node icons of all the target nodes for the user to make a selection. Each node icon includes a connection port. The user may control the cursor to click on ports of two nodes through the input device such as the mouse so as to make a connection. Alternatively, the user may make a connection by dragging the cursor from one node port to another node port. No specific limitations are made here.

Finally, if the user does not have the configuration requirements for a target node, the user may submit the above-constructed post-processing effect component directly. If the user still wants to configure a parameter for each target node, the user may select any to-be-configured node among the displayed target nodes. The visual operation panel displays a node parameter configuration window of the to-be-configured node. The user may perform a related node parameter configuration (for example, a texture parameter configuration or a configuration of another parameter item) for the selected node in the node parameter configuration window and may submit the constructed post-processing effect component after completing the configuration for the to-be-configured node.

For the production method provided in this embodiment, from the perspective of a logic implementation of the production method, the production of the post-processing effect component may be described as the following: A node selection of a target node is received first through the visual operation panel, and the target node is displayed on a related production interface of the visual operation panel; then a connection operation between selected target nodes is received, where for two nodes with a connection, the connection may represent the processing sequence between the two nodes; moreover, the operation of the node parameter configuration may also be received, and thus the construction of the post-processing effect component is completed to respond to the node parameter configuration.

Each selectable node in the production method is equivalent to a related material function in the post-processing effect. This embodiment may pre-form a node resource file of each material function, for example, a material programming file and a material attribute file. The node resource file is stored in the resource file subsystem. The target node is displayed on the visual operation panel. The node resource file acquired from the resource file subsystem is mainly taken as low-layer data support. Moreover, after the node connection and node parameter configuration are performed for the target node, the entire node topological structure may serve as the produced post-processing effect component. The node topological structure and the association information corresponding to each node in the node topological structure may serve as an entire component resource file to be stored in the resource file subsystem.

In S202, the resource file subsystem provides the visual operation panel with a node-related file required by a construction of the post-processing effect component, and receives and stores a component resource file submitted by the visual operation panel relative to the post-processing effect component.

This embodiment may pre-form a node resource file of each material function, for example, a material programming file and a material attribute file. The node resource file is stored in the resource file subsystem. The target node is displayed on the visual operation panel. The node resource file acquired from the resource file subsystem is mainly taken as low-layer data support. Moreover, after the node connection and node parameter configuration are performed for the target node, the entire node topological structure may serve as the produced post-processing effect component. The node topological structure and the association information corresponding to each node in the node topological structure may serve as an entire component resource file to be stored in the resource file subsystem.

The production system of this embodiment requires some pre-processing operations before providing the user with a production service of the post-processing effect component. For example, functional programming is performed for each common post-processing material in advance to form a corresponding material function and be encapsulated into a node. Moreover, node-related information is stored in the resource file subsystem 20 in the form of a resource file. Each node may also form a node menu list through a node name for the user to make a selection. In this embodiment, because the resource file subsystem stores the information related to a selected node, the user does not need to perform material writing but only needs to select an appropriate node, thereby greatly saving manpower.

It is to be known that the resource file subsystem may store a resource file of a single node or may store a resource file of a combined node composed of two or more nodes. The resource file of the combined node includes not only a material function but also a connection relationship between nodes in the combined node.

In this embodiment, the visual operation panel is used for performing a human-computer interaction with the user and reading related resource information from the resource file subsystem. After the node selection of the target node, the inter-node connection of the target node, and the node parameter configuration of the target node are completed, the visual operation panel responds to the construction operation triggered by the user. In this case, the construction of the post-processing effect component is completed. The user may click on, for example, a submission button to indicate that the production is completed. The visual operation panel, in response to an operation of a production completion, saves the produced post-processing effect component to the resource file subsystem for reference in subsequent rendering.

As an optional embodiment of embodiment one, the optional embodiment further includes the step below based on the preceding embodiment: When a calling condition of the post-processing effect component is satisfied, an associated component resource file is referenced by an effect rendering engine from the resource file subsystem through a corresponding rendering component, and the post-processing effect is rendered by the effect rendering engine.

The calling condition is that a current determination object during an effect component determination, after an augmented reality (AR) effect is started, is the post-processing effect component. It is to be understood that after the augmented reality (AR) effect is started, all effect components required by the augmented reality (AR) effect need to be determined first and then loaded successively. In the determination of a effect component, when the current determination object is the post-processing effect component, the effect rendering engine references the component resource file associated with the post-processing effect from the resource file subsystem to constitute the scene component of the post-processing effect component. The scene component may modify a resource file reference and configure a resource parameter. Compared with a traditional rendering component, the scene component panel of a node tool is more concise. Because the rendering of the post-processing effect is completed in the scene component, all post-processing is the same for the post-processing effect production system. The user does not need to care about implementation details so that the repeated use of post-processing rendering is implemented.

This embodiment of the present disclosure discloses a post-processing effect production method. The method includes the following steps: A visual operation panel, in response to an operation instruction triggered by a user, performs a construction operation of a post-processing effect component, where the construction operation includes a node selection, an inter-node connection and a node parameter configuration that are performed for a related target node in the post-processing effect component; a resource file subsystem provides the visual operation panel with a node-related file required by a construction of the post-processing effect component, receives and stores a component resource file submitted by the visual operation panel relative to the post-processing effect component. The method encapsulates each pre-formed material function into a node and stores a node-related resource file in the resource file subsystem. When the post-processing effect component is constructed, the construction of the post-processing effect component can be implemented only by performing the node selection, the inter-node connection and the node parameter configuration in the visual operation panel and calling the node-related file required by the construction of the post-processing effect component from the resource file subsystem. Accordingly, the construction is simple, efficient, and reusable, avoiding the repeated production of a related file when each post-processing effect is produced. Moreover, a relationship between nodes in the post-processing effect can be configured on the visual operation panel, implementing a concise connection relationship between post-processing effects. The preceding technical solutions of this embodiment effectively save the cost of producing a post-processing effect related to an augmented effect and improve the operability of producing the post-processing effect.

Embodiment Three

Figure 3:
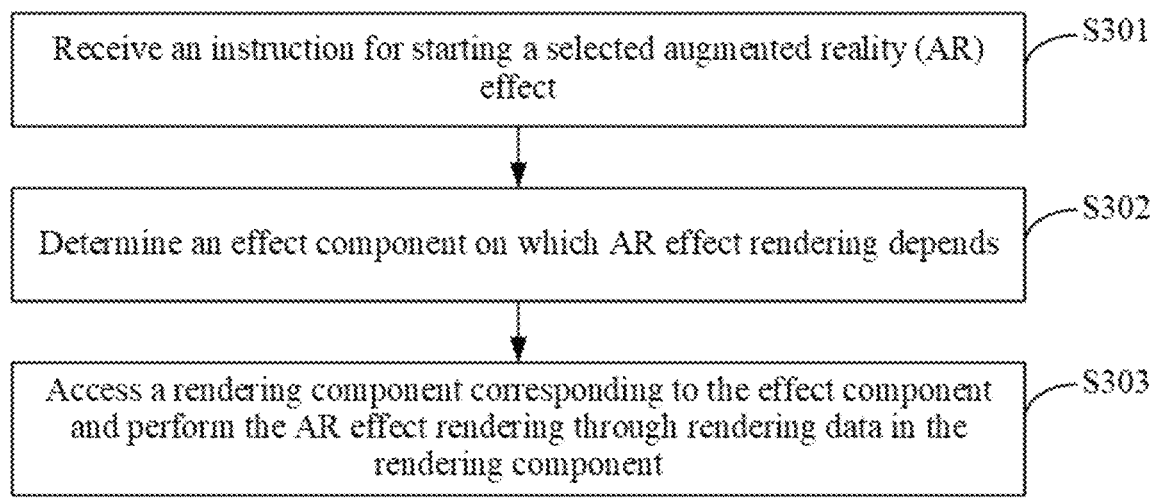
FIG. 3 is a flowchart of an AR effect rendering method according to embodiment three of the present disclosure.

FIG. 3 is a flowchart of an AR effect rendering method according to embodiment three of the present disclosure. This embodiment is applicable to the case of performing AR effect rendering for original information. The method may be performed by an AR effect rendering apparatus. The apparatus may be implemented by software and/or hardware and may be configured in an electronic device such as a terminal and/or a server so as to implement the AR effect rendering method in this embodiment of the present disclosure.

As shown in FIG. 3, the AR effect rendering method provided in embodiment three of the present disclosure specifically includes the steps below.

In S301, an instruction for starting a selected augmented reality (AR) effect is received.

In this embodiment, the electronic device performing the method provided in this embodiment may preferably be a mobile terminal such as a mobile phone or a tablet computer. Application software with the function of augmented reality (AR) effects is installed on the electronic device and may be photographic software or other application software that supports the function of augmented reality (AR) effects. The equipped function of augmented reality (AR) effects may be integrated as a plug-in into the application software. Exemplarily, the function of augmented reality (AR) effects may be taken as an AR effect prop function option and displayed on an application window interface. An instruction box including at least one AR effect may be displayed through the trigger of the AR effect prop function option by a user.

In this embodiment, as one example, the instruction for starting the selected augmented reality (AR) effect may be an instruction for the user starting any AR effect in a displayed AR effect selection bar. An operation of the user starting an AR effect may be received in this step. In this embodiment, no limitations are made to the AR effect which may be any AR effect launched by an application software developer. Exemplarily, the AR effect may be an effect of a virtual snowflake, an effect of petal falling, and the like. Specifically, the instruction for the user starting the selected augmented reality (AR) effect may be acquired in this step.

In S302, an effect component on which AR effect rendering depends is determined.

Specifically, AR effect rendering logic always depends on a plurality of effect components associated with each other. When the AR effect rendering is performed, all the effect components are loaded so that the AR effect rendering is performed according to each effect component. Accordingly, all the effect components on which the AR effect rendering depends are determined first in this step. It is to be known that the effect components include one or more post-processing effect components and one or more other effect components.

In S303, a rendering component corresponding to the effect component is accessed, and the AR effect rendering is performed through rendering data in the rendering component. The effect component includes a post-processing effect component. The post-processing effect component is produced through the post-processing effect production system described in embodiment one.

Specifically, effect components determined through the preceding step include a post-processing effect component and another effect component. Each effect component corresponds to a rendering component. The rendering component stores rendering data that represents each rendering parameter corresponding to the effect component. The corresponding post-processing effect component may be produced by the post-processing effect production system described in embodiment one. For another component, AR effect rendering may be performed according to the related art.

As an optional embodiment of embodiment three, the optional embodiment may make an optimization based on the preceding embodiment. When the effect component is the post-processing effect component, the step in which the rendering component corresponding to the effect component is accessed and the AR effect rendering is performed through the rendering data in the rendering component includes the steps below.

In a3, an effect rendering engine in the production system is accessed, and that a calling condition of the post-processing effect component is currently satisfied is determined.

The calling condition is that a current determination object during an effect component determination, after the augmented reality (AR) effect is started, is the post-processing effect component. Specifically, when the currently-determined effect component is the post-processing effect component, the effect rendering engine in the post-processing effect production system is accessed.

In b3, an associated component resource file is referenced by the effect rendering engine from a resource file subsystem of the production system to constitute a scene component of the post-processing effect component.

In this step, the component resource file associated with the current post-processing effect component may be acquired through the effect rendering engine from the resource file subsystem of the production system, and the component resource file constitutes the scene component of the post-processing effect component. The scene component includes the rendering data. The rendering data represents an attribute of rendering.

In c3, the post-processing effect component is rendered through the scene component.

Specifically, the scene component includes the rendering data. The rendering data represents the attribute information of the post-processing effect component. The post-processing effect component may be rendered by loading and rendering the rendering data of the scene component.

This embodiment of the present disclosure discloses an AR effect rendering method. The method includes the following steps: An instruction for starting a selected augmented reality (AR) effect is received; an effect component on which AR effect rendering depends is determined; a rendering component corresponding to the effect component is accessed, and the AR effect rendering is performed through rendering data in the rendering component. The effect component includes a post-processing effect component. The post-processing effect component is produced through the post-processing effect production system described in embodiment one. In performing AR effect rendering through this method, when the depended effect component is the post-processing effect component, the post-processing effect component is produced through the post-processing effect production system described in embodiment one. When the post-processing effect component is constructed, the production of a post-processing effect can be implemented only by performing a node selection, an inter-node connection and a node parameter configuration in a visual operation panel and calling a node-related file required by the construction of the post-processing effect component from the resource file subsystem. Accordingly, the construction is simple, efficient, and reusable, avoiding the repeated production of a related file when each post-processing effect is produced. Moreover, a relationship between nodes in the post-processing effect can be configured on the visual operation panel, implementing a concise connection relationship between post-processing effects. The preceding technical solutions of this embodiment effectively save the cost of augmented reality (AR) effect rendering and improve the operability of AR effect rendering.

Embodiment Four

Figure 4:
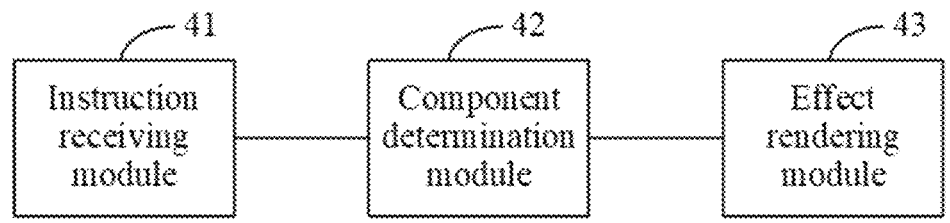
FIG. 4 is a diagram illustrating the structure of an AR effect rendering apparatus according to embodiment four of the present disclosure.

FIG. 4 is a diagram illustrating the structure of an AR effect rendering apparatus according to embodiment four of the present disclosure. This embodiment is applicable to the case of performing AR effect rendering for original information. The apparatus may be implemented by software and/or hardware and may be configured in a terminal and/or a server so as to implement the AR effect rendering method in the embodiment of the present disclosure. The apparatus may specifically include an instruction receiving module 41, a component determination module 42, and an effect rendering module 43.

The instruction receiving module 41 is configured to receive an instruction for starting a selected augmented reality (AR) effect.

The component determination module 42 is configured to determine an effect component on which AR effect rendering depends.

The effect rendering module 43 is configured to access a rendering component corresponding to the effect component and perform the AR effect rendering through rendering data in the rendering component.

The effect component includes a post-processing effect component. The post-processing effect component is produced through the post-processing effect production system described in embodiment one.

Further, when the effect component is the post-processing effect component, the effect rendering module 43 is specifically configured to perform the steps below.

An effect rendering engine in the production system is accessed, and that a calling condition of the post-processing effect component is currently satisfied is determined.

An associated component resource file is referenced by the effect rendering engine from a resource file subsystem of the production system to constitute a scene component of the post-processing effect component.

The post-processing effect component is rendered through the scene component.

The preceding apparatus may perform the AR effect rendering method provided by any embodiment of the present disclosure and has functional modules and beneficial effects corresponding to the performed method.

It is to be noted that units and modules included in the preceding apparatus are divided according to function logic, and these units and modules may also be divided in other manners as long as the corresponding functions can be achieved. Moreover, the specific names of function units are used for distinguishing between each other and not intended to limit the scope of embodiments of the present disclosure.

Embodiment Five

Figure 5:
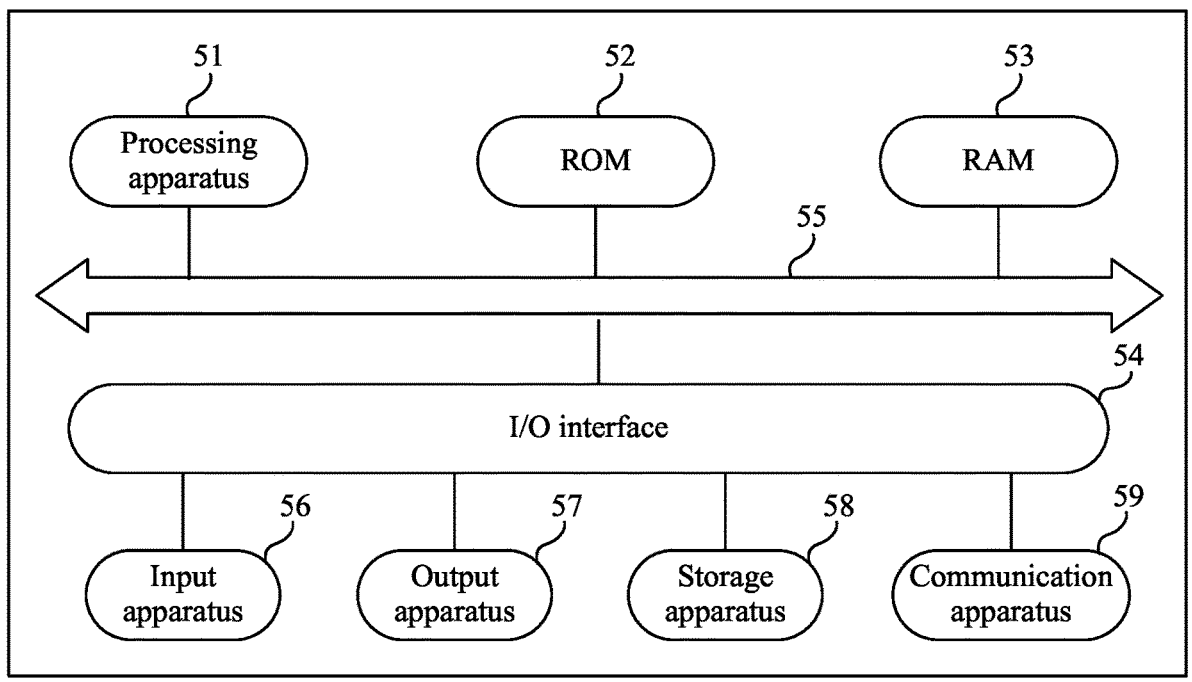
FIG. 5 is a diagram illustrating the structure of an electronic device according to embodiment five of the present disclosure.

FIG. 5 is a diagram illustrating the structure of an electronic device according to embodiment five of the present disclosure. FIG. 5 shows a diagram illustrating the structure of an electronic device 50 (such as a terminal device or server in FIG. 5) applicable to implementing embodiments of the present disclosure. A terminal device in embodiments of the present disclosure may include, but is not limited to, mobile terminals such as a mobile phone, a laptop, a digital broadcast receiver, a personal digital assistant (PDA), a Pad, a portable media player (PMP), and an in-vehicle terminal (such as an in-vehicle navigation terminal) and stationary terminals such as a digital television (TV) and a desktop computer. The electronic device shown in FIG. 5 is merely an example and is not intended to limit the function and usage scope of embodiments of the present disclosure.

As shown in FIG. 5, the electronic device 50 may include a processing apparatus 51 (such as a central processing unit and a graphics processing unit). The processing apparatus 51 may perform various types of appropriate operations and processing based on a program stored in a read-only memory (ROM) 52 or a program loaded from a storage apparatus 58 to a random-access memory (RAM) 53. Various programs and data required for the operation of the electronic device 50 are also stored in the RAM 53. The processing apparatus 51, the ROM 52, and the RAM 53 are connected to each other through a bus 55. An input/output (I/O) interface 54 is also connected to the bus 55.

Generally, the following apparatus may be connected to the I/O interface 54: an input apparatus 56 such as a touch screen, a touch pad, a keyboard, a mouse, a camera, a microphone, an accelerometer, and a gyroscope; an output apparatus 57 such as a liquid crystal display (LCD), a speaker, and a vibrator; the storage apparatus 58 such as a magnetic tape and a hard disk; and a communication apparatus 59. The communication apparatus 59 may allow the electronic device 50 to perform wireless or wired communication with other devices to exchange data. Although FIG. 5 shows the electronic device 50 having various apparatuses, it is to be understood that all of the apparatuses shown herein need not be implemented or present. Alternatively, more or fewer apparatuses may be implemented or present.

Particularly, according to embodiments of the present disclosure, the process described above with reference to a flowchart may be implemented as a computer software program. For example, a computer program product is included in embodiments of the present disclosure. The computer program product includes a computer program carried in a non-transitory computer-readable medium. The computer program includes program codes for executing the method shown in the flowchart. In such an embodiment, the computer program may be downloaded from a network and installed through the communication apparatus 59, or may be installed from the storage apparatus 58, or may be installed from the ROM 52. When the computer program is executed by the one or more processing apparatuses 51, the preceding functions defined in the methods of embodiments of the present disclosure are performed.

The names of messages or information exchanged between multiple apparatuses in embodiments of the present disclosure are only for illustrative purposes and are not intended to limit the scope of such messages or information.

The electronic device provided in this embodiment of the present disclosure and the post-processing effect production method and/or the AR effect rendering method according to the preceding embodiments belong to the same inventive concept. For technical details not described in detail in the embodiment, reference may be made to the preceding embodiments. The embodiment has the same beneficial effects as the preceding embodiments.

Embodiment Six

This embodiment of the present disclosure provides a computer storage medium storing a computer program. When the program is executed by a processor, the post-processing effect production method and/or the AR effect rendering method according to the preceding embodiments is performed.

It is to be noted that the preceding computer-readable medium in the present disclosure may be a computer-readable signal medium or a computer-readable storage medium or any combination thereof. The computer-readable storage medium, for example, may be, but is not limited to, an electrical, magnetic, optical, electromagnetic, infrared, or semiconductor system, apparatus, or device, or any combination thereof. More specific examples of the computer-readable storage medium may include, but are not limited to, an electrical connection with one or more wires, a portable computer magnetic disk, a hard disk, a random-access memory (RAM), a read-only memory (ROM), an erasable programmable read-only memory (EPROM), a flash memory, an optical fiber, a portable compact disk read-only memory (CD-ROM), an optical memory device, a magnetic memory device, or any appropriate combination thereof.

In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as a part of a carrier, and computer-readable program codes are carried in the data signal. The data signal propagated in this manner may be in multiple forms and includes, and is not limited to, an electromagnetic signal, an optical signal, or any suitable combination thereof. The computer-readable signal medium may further be any computer-readable medium other than the computer-readable storage medium. The computer-readable signal medium may send, propagate, or transmit a program used by or in conjunction with an instruction execution system, apparatus, or device. The program codes included on the computer-readable medium may be transmitted via any appropriate medium which includes, but is not limited to, a wire, an optical cable, a radio frequency (RF), or any appropriate combination thereof.

In some embodiments, clients and servers may communicate using any currently known or future developed network protocol, such as the HyperText Transfer Protocol (HTTP), and may be interconnected with any form or medium of digital data communication (such as a communication network). Examples of the communication network include a local area network (LAN), a wide area network (WAN), an internet (such as the Internet) and a peer-to-peer network (such as an ad hoc network), as well as any currently known or future developed network.

The computer-readable medium may be included in the electronic device or may exist alone without being assembled into the electronic device.

The computer-readable medium carries one or more programs. When the one or more programs are executed by the electronic device, the electronic device is configured to perform the function below.

Computer program codes for performing the operations in the present disclosure may be written in one or more programming languages or combination thereof. The preceding one or more programming languages include, but are not limited to, object-oriented programming languages such as Java, Smalltalk and C++, as well as conventional procedural programming languages such as C or similar programming languages. Program codes may be executed entirely on a user computer, partly on a user computer, as a stand-alone software package, partly on a user computer and partly on a remote computer, or entirely on a remote computer or a server. In the case where the remote computer is involved, the remote computer may be connected to the user computer via any type of network including a local area network (LAN) or a wide area network (WAN) or connected to an external computer (for example, through the Internet using an Internet service provider).

The flowcharts and block diagrams in the drawings show the possible architecture, function and operation of the system, method and computer program product according to various embodiments of the present disclosure. In this regard, each block in the flowcharts or block diagrams may represent a module, a program segment, or part of codes that contains one or more executable instructions for implementing specified logical functions. It is also to be noted that in some alternative implementations, the functions marked in the blocks may occur in an order different from those marked in the drawings. For example, two successive blocks may, in fact, be executed substantially in parallel or in a reverse order, which depends on the functions involved. It is also to be noted that each block in the block diagrams and/or flowcharts and a combination of blocks in the block diagrams and/or flowcharts may be implemented by a specific-purpose hardware-based system which performs specified functions or operations or a combination of specific-purpose hardware and computer instructions.

The units involved in embodiments of the present disclosure may be implemented by software or hardware. The names of the units do not constitute a limitation on the units themselves. For example, a first acquisition unit may also be described as "a unit for acquiring at least two Internet protocol addresses".

The functions described above herein may be executed, at least partially, by one or more hardware logic components. For example, and without limitations, example types of hardware logic components that may be used include: a field-programmable gate array (FPGA), an application-specific integrated circuit (ASIC), an application-specific standard product (ASSP), a system on a chip (SOC), a complex programmable logic device (CPLD) and the like.

In the context of the present disclosure, the machine-readable medium may be a tangible medium that may include or store a program that is used by or used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. Concrete examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination thereof.

According to one or more embodiments of the present disclosure, example one provides a post-processing effect production system. The system includes a visual operation panel and a resource file subsystem. The visual operation panel is configured to, in response to an operation instruction triggered by a user, perform a construction operation of a post-processing effect component. The construction operation includes a node selection, an inter-node connection and a node parameter configuration that are performed for a related target node in the post-processing effect component. The resource file subsystem is configured to provide the visual operation panel with a node-related file required by a construction of the post-processing effect component, and receive and store a component resource file submitted by the visual operation panel relative to the post-processing effect component.

According to one or more embodiments of the present disclosure, example two provides a post-processing effect production system. The system is optimized to further include an effect rendering engine. The effect rendering engine is configured to, when a calling condition of the post-processing effect component is satisfied, reference an associated component resource file from the resource file subsystem to constitute a scene component of the post-processing effect component and render the post-processing effect through the scene component.

According to one or more embodiments of the present disclosure, example three provides a post-processing effect production system. The system may optimize that the calling condition is that a current determination object during an effect component determination, after an augmented reality (AR) effect is started, is the post-processing effect component.

According to one or more embodiments of the present disclosure, example four provides a post-processing effect production system. In the system, the visual operation panel may be optimized to further include a first receiving module, a first display module, a second receiving module, and a second display module. The first receiving module is configured to receive a node adding operation. The node adding operation is to select a node adding option from a menu list displayed on a component production interface. The first display module is configured to display a node menu list. The node menu list includes at least one node name of at least one created post-processing node. The second receiving module is configured to receive a node selection operation. The node selection operation is to select a target node name of the target node from the node menu list. The second display module is configured to display the target node on the component production interface. The target node includes at least one node connection port. The component production interface is displayed in a first set region of a screen interface.

According to one or more embodiments of the present disclosure, example five provides a post-processing effect production system. The system may optimize that the target node is displayed on the component production interface as a single atomic node or that the target node is displayed on the component production interface as a combined node constituted in the form of a node topological structure. The combined node includes at least two atomic nodes and a related node connection line.

According to one or more embodiments of the present disclosure, example six provides a post-processing effect production system. In the system, the second display module may be optimized to be specifically configured to access the resource file subsystem, search for a node-related file corresponding to the target node through the target node name, and display the target node in a set node form on the component production interface through the node-related file. The node-related file includes a node programming file and a node parameter configuration file. Alternatively, the node-related file includes a node programming file, a node parameter configuration file, and a node connection topology file.

According to one or more embodiments of the present disclosure, example seven provides a post-processing effect production system. In the system, the visual operation panel may be optimized to further include a third receiving module and a third display module. The third receiving module is configured to receive a node connection operation. The node connection operation is to drag the cursor from a first node connection port of a first node to a second node connection port of a second node. The first node and the second node are selected from target nodes displayed on the component production interface. The third display module is configured to display a node connection line between the first node connection port and the second node connection port.

According to one or more embodiments of the present disclosure, example eight provides a post-processing effect production system. In the system, the visual operation panel may be optimized to further include a fourth receiving module and a fourth display module. The fourth receiving module is configured to receive a node configuration operation. The node configuration operation is to select any to-be-configured node from the displayed target nodes. The fourth display module is configured to display, in a node parameter configuration panel, each parameter configuration item corresponding to the to-be-configured node so that the user implements a parameter configuration of the to-be-configured node by editing each parameter configuration item. The node parameter configuration panel is displayed in a second set region of the screen interface.

According to one or more embodiments of the present disclosure, example nine provides a post-processing effect production system. In the system, the visual operation panel may further preferably include a fifth receiving module and a submission response module. The fifth receiving module is configured to receive a production submission operation triggered by the user. The submission response module is configured to take a node topological structure constructed and formed on the component production interface as the produced post-processing effect component and submit the corresponding component resource file to the resource file subsystem.

According to one or more embodiments of the present disclosure, example ten provides a post-processing effect production system. In the system, the submission response module may be optimized to be specifically configured to acquire the node topological structure constructed and formed on the component production interface, to take the node topological structure as the post-processing effect component currently produced, to summarize node production information corresponding to each target node in the node topological structure, to take the node production information as the component resource file of the post-processing effect component, and to submit the component resource file to the resource file subsystem.

According to one or more embodiments of the present disclosure, example eleven provides a post-processing effect production system. In the system, the resource file subsystem is configured to name and store the component resource file according to a set naming format. The resource file subsystem may be optimized to be further configured to take a file name of the component resource file as a node name of a newly-constructed combined node to update the node menu list.

According to one or more embodiments of the present disclosure, example twelve provides a post-processing effect production system. In the system, the resource file subsystem may be optimized to further include a node resource file of each atomic node that has been created, a node resource file of each combined node that has been created, a node connection topology file of each combined node that has been created, and the component resource file of the post-processing effect component that has been produced. Each atomic node is a single node. Each combined node is a node topological structure constituted by at least two atomic nodes. The component resource file includes a node resource file of each node related to the post-processing effect component, a node connection topology file of each node related to the post-processing effect component, and a node port attribute file of each node related to the post-processing effect component. The node resource file includes a node programming file and a node parameter configuration file.

According to one or more embodiments of the present disclosure, example thirteen provides an AR effect rendering method. The method includes the following steps: An instruction for starting a selected augmented reality (AR) effect is received; an effect component on which AR effect rendering depends is determined; a rendering component corresponding to the effect component is accessed, and the AR effect rendering is performed through rendering data in the rendering component. The effect component includes a post-processing effect component. The post-processing effect component is produced through the post-processing effect production system described in any one of the preceding examples one to twelve.

According to one or more embodiments of the present disclosure, example fourteen provides an AR effect rendering method. When the effect component is the post-processing effect component, the step in which the rendering component corresponding to the effect component is accessed and the AR effect rendering is performed through the rendering data in the rendering component may be optimized to include the following steps: An effect rendering engine in the production system is accessed, and that a calling condition of the post-processing effect component is currently satisfied is determined; an associated component resource file is referenced by the effect rendering engine from a resource file subsystem of the production system to constitute a scene component of the post-processing effect component; and the post-processing effect component is rendered through the scene component.

The preceding description is merely illustrative of preferred embodiments of the present disclosure and the technical principles used therein. It is to be understood by those skilled in the art that the scope of disclosure involved in the present disclosure is not limited to the technical solutions formed by particular combinations of the preceding technical features and should also cover other technical solutions formed by any combinations of the preceding technical features or their equivalents without departing from the concept of the present disclosure, for example, technical solutions formed by the substitutions of the preceding features with the technical features (not limited to being) disclosed in the present disclosure and having similar functions.

Additionally, although operations are depicted in a particular order, this should not be construed as that these operations are required to be performed in the particular order shown or in a sequential order. In certain circumstances, multitasking and parallel processing may be advantageous. Similarly, although several specific implementation details are included in the preceding discussion, these should not be construed as limiting the scope of the present disclosure. Some features described in the context of separate embodiments may also be implemented in combination in a single embodiment. Conversely, various features described in the context of a single embodiment may also be implemented in multiple embodiments individually or in any suitable sub-combination.

Although the subject matter is described in the language specific to structural features and/or methodological logic acts, it is to be understood that the subject matter defined in the appended claims is not necessarily limited to the specific features or acts described above. Conversely, the particular features and acts described above are merely example forms for implementing the claims.

What is claimed is:

1. A post-processing effect production system, comprising:
   a visual operation panel configured to, in response to an operation instruction triggered by a user, perform a construction operation of a post-processing effect component, wherein the construction operation comprises a node selection, an inter-node connection and a node parameter configuration that are performed for a related target node in the post-processing effect component;
   a resource file subsystem configured to provide the visual operation panel with a node-related file required by a construction of the post-processing effect component, and receive and store a component resource file submitted by the visual operation panel relative to the post-processing effect component; and
   an effect rendering engine configured to, when a calling condition of the post-processing effect component is satisfied, reference an associated component resource file from the resource file subsystem to constitute a scene component of the post-processing effect component and render post-processing effect through the scene component.

2. The system according to claim 1, wherein the calling condition is that a current determination object during an effect component determination, after an augmented reality (AR) effect is started, is the post-processing effect component.

3. The system according to claim 1, wherein the visual operation panel comprises:
   a first receiving module configured to receive a node adding operation, wherein the node adding operation is to select a node adding option from a menu list displayed on a component production interface;
   a first display module configured to display a node menu list, wherein the node menu list comprises at least one node name of at least one created post-processing node;
   a second receiving module configured to receive a node selection operation, wherein the node selection operation is to select a target node name of a target node from the node menu list; and
   a second display module configured to display the target node on the component production interface, wherein the target node comprises at least one node connection port,
   wherein the component production interface is displayed in a first set region of a screen interface.

4. The system according to claim 3, wherein the target node is displayed on the component production interface as a single atomic node; or
   the target node is displayed on the component production interface as a combined node constituted in a form of a node topological structure, wherein the combined node comprises at least two atomic nodes, and a related node connection line.

5. The system according to claim 3, wherein the second display module is specifically configured to:
   access the resource file subsystem, and search for a node-related file corresponding to the target node through the target node name; and
   display the target node in a set node form on the component production interface through the node-related file,
   wherein the node-related file comprises a node programming file and a node parameter configuration file; or the node-related file comprises a node programming file, a node parameter configuration file, and a node connection topology file.

6. The system according to claim 1, wherein the visual operation panel further comprises:
   a third receiving module configured to receive a node connection operation, wherein the node connection operation is to drag a cursor from a first node connection port of a first node to a second node connection port of a second node, and the first node and the second node are selected from target nodes displayed on a component production interface; and
   a third display module configured to display a node connection line between the first node connection port and the second node connection port.

7. The system according to claim 1, wherein the visual operation panel further comprises:
- a fourth receiving module configured to receive a node configuration operation, wherein the node configuration operation is to select any to-be-configured node from displayed target nodes; and
- a fourth display module configured to display, in a node parameter configuration panel, each parameter configuration item corresponding to the any to-be-configured node so that the user implements a parameter configuration of the any to-be-configured node by editing the each parameter configuration item,
- wherein the node parameter configuration panel is displayed in a second set region of a screen interface.

8. The system according to claim 1, wherein the visual operation panel further comprises:
- a fifth receiving module configured to receive a production submission operation triggered by the user; and
- a submission response module configured to take a node topological structure constructed and formed on a component production interface, as a produced post-processing effect component, and submit a corresponding component resource file to the resource file subsystem.

9. The system according to claim 8, wherein the submission response module is specifically configured to:
- acquire the node topological structure constructed and formed on the component production interface, and take the node topological structure as the post-processing effect component currently produced; and
- summarize node production information corresponding to each target node in the node topological structure, take the node production information as the component resource file of the post-processing effect component, and submit the component resource file to the resource file subsystem.

10. The system according to claim 8, wherein the resource file subsystem is configured to:
- name and store the component resource file according to a set naming format; and
- the resource file subsystem is further configured to:
- take a file name of the component resource file as a node name of a newly-constructed combined node to update a node menu list.

11. The system according to claim 1, wherein the resource file subsystem comprises:
- a node resource file of each atomic node that has been created, a node resource file of each combined node that has been created, a node connection topology file of each combined node that has been created, and the component resource file of the post-processing effect component that has been produced,
- wherein the each atomic node is a single node, and the each combined node is a node topological structure constituted by at least two atomic nodes;
- wherein the component resource file comprises a node resource file of each node related to the post-processing effect component, a node connection topology file of the each node related to the post-processing effect component, and a node port attribute file of the each node related to the post-processing effect component; and
- wherein the node resource file comprises a node programming file and a node parameter configuration file.

12. The system according to claim 1, wherein the resource file subsystem comprises:
- a node resource file of each atomic node that has been created, a node resource file of each combined node that has been created, a node connection topology file of each combined node that has been created, and the component resource file of the post-processing effect component that has been produced,
- wherein the each atomic node is a single node, and the each combined node is a node topological structure constituted by at least two atomic nodes;
- wherein the component resource file comprises a node resource file of each node related to the post-processing effect component, a node connection topology file of the each node related to the post-processing effect component, and a node port attribute file of the each node related to the post-processing effect component; and
- wherein the node resource file comprises a node programming file and a node parameter configuration file.

13. A post-processing effect production method, comprising:
- in response to an operation instruction triggered by a user, performing, by a visual operation panel, a construction operation of a post-processing effect component, wherein the construction operation comprises a node selection, an inter-node connection and a node parameter configuration that are performed for a related target node in the post-processing effect component;
- providing, by a resource file subsystem, the visual operation panel with a node-related file required by a construction of the post-processing effect component; and
- receiving and storing, by the resource file subsystem, a component resource file submitted by the visual operation panel relative to the post-processing effect component; and
- when a calling condition of the post-processing effect component is satisfied, referencing, by an effect rendering engine, an associated component resource file from the resource file subsystem through a corresponding rendering component; and rendering, by the effect rendering engine, post-processing effect.

14. An AR effect rendering method, comprising:
- receiving an instruction for starting a selected augmented reality (AR) effect;
- determining an effect component on which AR effect rendering depends; and
- accessing a rendering component corresponding to the effect component, and performing the AR effect rendering through rendering data in the rendering component,
- wherein the effect component comprises a post-processing effect component, and the post-processing effect component is produced through the post-processing effect production method according to claim 13.

15. The method according to claim 14, wherein when the effect component is the post-processing effect component,
- accessing the rendering component corresponding to the effect component, and performing the AR effect rendering through the rendering data in the rendering component comprises:
- accessing an effect rendering engine in the production system, and determining that a calling condition of the post-processing effect component is currently satisfied;
- referencing, by the effect rendering engine, an associated component resource file from a resource file subsystem of the production system to constitute a scene component of the post-processing effect component; and
- rendering the post-processing effect component through the scene component.

16. An AR effect rendering apparatus, comprising:
an instruction receiving module configured to receive an instruction for starting a selected augmented reality (AR) effect;
a component determination module configured to determine an effect component on which AR effect rendering depends; and
an effect rendering module configured to access a rendering component corresponding to the effect component and perform the AR effect rendering through rendering data in the rendering component,
wherein the effect component comprises a post-processing effect component, and the post-processing effect component is produced through the post-processing effect production system according to claim 1.

17. A non-transitory computer-readable storage medium, storing a computer program, wherein when the computer program is executed by a processor, a post-processing effect production method is performed,
wherein the post-processing effect production method comprises:
in response to an operation instruction triggered by a user, performing, by a visual operation panel, a construction operation of a post-processing effect component, wherein the construction operation comprises a node selection, an inter-node connection and a node parameter configuration that are performed for a related target node in the post-processing effect component;
providing, by a resource file subsystem, the visual operation panel with a node-related file required by a construction of the post-processing effect component; and receiving and storing, by the resource file subsystem, a component resource file submitted by the visual operation panel relative to the post-processing effect component; and
when a calling condition of the post-processing effect component is satisfied, referencing, by an effect rendering engine, an associated component resource file from the resource file subsystem through a corresponding rendering component; and rendering, by the effect rendering engine, post-processing effect.

* * * * *